United States Patent
Kim et al.

(10) Patent No.: US 12,238,017 B2
(45) Date of Patent: *Feb. 25, 2025

(54) METHOD AND APPARATUS FOR TRANSMISSION AND RECEPTION IN WIRELESS COMMUNICATION SYSTEM SUPPORTING SCALABLE FRAME STRUCTURE

(71) Applicant: Samsung Electronics Co., Ltd., Gyeonggi-do (KR)

(72) Inventors: Youngbum Kim, Seoul (KR); Younsun Kim, Gyeonggi-do (KR); Yongjun Kwak, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,888

(22) Filed: Jun. 5, 2023

(65) Prior Publication Data

US 2023/0308230 A1    Sep. 28, 2023

Related U.S. Application Data

(63) Continuation of application No. 15/598,932, filed on May 18, 2017, now Pat. No. 11,671,213.

(30) Foreign Application Priority Data

May 19, 2016 (KR) .................. 10-2016-0061495

(51) Int. Cl.
*H04L 5/00* (2006.01)
*H04J 11/00* (2006.01)
(Continued)

(52) U.S. Cl.
CPC ........ *H04L 5/0007* (2013.01); *H04J 11/0093* (2013.01); *H04L 1/1829* (2013.01);
(Continued)

(58) Field of Classification Search
CPC ... H04L 5/0007; H04L 1/1829; H04L 5/0064; H04L 5/1469; H04L 27/2602;
(Continued)

(56) References Cited

U.S. PATENT DOCUMENTS 8,031,583 B2   10/2011   Classon et al.
8,953,615 B2   2/2015    Cai et al.
(Continued)

FOREIGN PATENT DOCUMENTS

CN   101924721   12/2010
CN   102273162   12/2011
(Continued)

OTHER PUBLICATIONS

Ericsson LM, "Introduction of EC-EGPRS, Multiple Access and Timeslot Structure", GP-151219, 3GPP TSG-GERAN #68, Nov. 16-19, 2015, 23 pages.
(Continued)

*Primary Examiner* — Oussama Roudani
(74) *Attorney, Agent, or Firm* — The Farrell Law Firm, P.C.

(57) ABSTRACT

An apparatus and method are provided for transmitting and receiving signals in a wireless communication system. A method includes transmitting a first signal using a first frame structure to a first terminal; and transmitting a second signal using a second frame structure to a second terminal. A subcarrier spacing of the second frame structure is a multiple of a subcarrier spacing of the first frame structure. A length of a subframe in the first frame structure is a multiple of a length of a subframe in the second frame structure.

16 Claims, 20 Drawing Sheets

(51) Int. Cl.
    *H04L 1/1829*    (2023.01)
    *H04L 5/14*    (2006.01)
    *H04L 27/26*    (2006.01)
(52) U.S. Cl.
    CPC .......... *H04L 5/0064* (2013.01); *H04L 5/1469*
        (2013.01); *H04L 27/2602* (2013.01); ***H04L
        27/26025* (2021.01); *H04L 27/2607*** (2013.01);
        *H04L 5/0048* (2013.01)
(58) Field of Classification Search
    CPC .......... H04L 27/26025; H04L 27/2607; H04L
        5/0048; H04L 27/2603; H04L 5/0053;
        H04J 11/0093
    See application file for complete search history.

(56) References Cited

U.S. PATENT DOCUMENTS

| | | | |
|---|---|---|---|
| 10,674,461 | B2 | 6/2020 | Ko |
| 10,721,036 | B2 * | 7/2020 | Yi .................... H04W 72/0446 |
| 2006/0245509 | A1 | 11/2006 | Khan |
| 2007/0183307 | A1 | 8/2007 | Akita et al. |
| 2007/0274203 | A1 | 11/2007 | Kimura |
| 2009/0122771 | A1 * | 5/2009 | Cai .................... H04L 27/2607 375/260 |
| 2010/0238847 | A1 | 9/2010 | Suo et al. |
| 2010/0254288 | A1 | 10/2010 | Lim et al. |
| 2011/0170504 | A1 | 7/2011 | Xu et al. |
| 2011/0176634 | A1 | 7/2011 | Yoon |
| 2011/0268079 | A1 | 11/2011 | Akita et al. |
| 2012/0002575 | A1 | 1/2012 | Noh et al. |
| 2012/0027110 | A1 | 2/2012 | Han et al. |
| 2014/0029568 | A1 | 1/2014 | Wang et al. |
| 2014/0071915 | A1 | 3/2014 | Papasakellariou |
| 2014/0161098 | A1 | 6/2014 | Marks et al. |
| 2015/0029903 | A1 | 1/2015 | Chen et al. |
| 2015/0180622 | A1 | 6/2015 | Yoo |
| 2015/0180636 | A1 | 6/2015 | Malladi |
| 2016/0029333 | A1 | 1/2016 | Seo et al. |
| 2016/0128028 | A1 | 5/2016 | Mallik |
| 2016/0128056 | A1 | 5/2016 | Jiang et al. |
| 2016/0242213 | A1 | 8/2016 | Dabeer |
| 2016/0301555 | A1 | 10/2016 | Nory |
| 2016/0352551 | A1 | 12/2016 | Zhang |
| 2016/0353476 | A1 | 12/2016 | Sartori |
| 2017/0118054 | A1 | 4/2017 | Ma |
| 2017/0156140 | A1 * | 6/2017 | Islam .................... H04L 5/0044 |
| 2017/0303303 | A1 | 10/2017 | Yang |
| 2017/0325250 | A1 | 11/2017 | Manolakos |
| 2017/0331547 | A1 | 11/2017 | Kim |
| 2017/0331658 | A1 | 11/2017 | Chen |
| 2018/0042013 | A1 * | 2/2018 | Byun .................... H04L 5/0048 |
| 2018/0063838 | A1 | 3/2018 | Tiirola |
| 2018/0103476 | A1 | 4/2018 | Wong |
| 2018/0167821 | A1 | 6/2018 | Seok |
| 2018/0206217 | A1 * | 7/2018 | Martin .................... H04W 72/51 |
| 2018/0206271 | A1 | 7/2018 | Chatterjee |
| 2018/0234967 | A1 | 8/2018 | Kim |
| 2018/0241508 | A1 | 8/2018 | Chervyakov |
| 2018/0262318 | A1 | 9/2018 | Au |
| 2018/0262378 | A1 | 9/2018 | Ma |
| 2019/0104533 | A1 * | 4/2019 | Kim .................... H04W 72/1268 |
| 2019/0166619 | A1 * | 5/2019 | Takeda .................... H04W 74/0833 |
| 2021/0044405 | A1 * | 2/2021 | Au .................... H04L 27/26025 |

FOREIGN PATENT DOCUMENTS

| | | |
|---|---|---|
| CN | 102325120 | 1/2012 |
| CN | 102422663 | 4/2012 |
| CN | 102804625 | 11/2012 |
| CN | 108029096 | 5/2018 |
| KR | 1020100089024 | 8/2010 |
| KR | 10-1537617 | 7/2015 |
| KR | 1020160005003 | 1/2016 |
| WO | WO 2016/192644 | 12/2016 |

OTHER PUBLICATIONS

International Search Report dated Jul. 24, 2017 issued in counterpart application No. PCT/KR2017/005192, 4 pages.
Huawei, HiSilicon, "Analysis and Comparison on Numerology Candidates", R1-164031, 3GPP TSG RAN WG1 Meeting #85, May 23-27, 2016, 6 pages.
Sony, "Discussion on Numerology Design for NR", R1-164658, 3GPP TSG RAN WG1 Meeting #85, May 23-27, 2016, 5 pages.
LG Electronics, "Support Different Numerology and Different Usage Scenarios", R1-164561, 3GPP TSG RAN WG1 Meeting #85, May 23-27, 2016, 6 pages.
European Search Report dated Mar. 6, 2019 issued in counterpart application No. 17799684.0-1219, 9 pages.
Samsung, "Discussion on Different Scaling Methods for NR Subcarrier Spacing", R1-163999, 3GPP TSG RAN WG1 Meeting #85, May 23-27, 2016, 5 pages.
Chinese Office Action dated Jan. 14, 2021 issued in counterpart application No. 201780030991.X, 14 pages.
Chinese Office Action dated Sep. 14, 2021 issued in counterpart application No. 201780030991.X, 7 pages.
Korean Office Action dated Jun. 27, 2022 issued in counterpart application No. 10-2017-0061888, 4 pages.
U.S. Appl. No. 62/333,539, filed May 9, 2016, pp. 1-24, Year: 2016.
Indian Examination Report dated Mar. 7, 2023 Issued in counterpart application No. 202138044938, 6 pages.
Chinese Office Action dated Aug. 29, 2023 issued in counterpart application No. 202111418059.9, 8 pages.

* cited by examiner

METHOD AND APPARATUS FOR TRANSMISSION AND RECEPTION IN WIRELESS COMMUNICATION SYSTEM SUPPORTING SCALABLE FRAME STRUCTURE

PRIORITY

This application is a continuation of U.S. application Ser. No. 15/598,932, which was filed in the U.S. Patent and Trademark Office on May 18, 2017, and claims priority under 35 U.S.C. § 119(a) to Korean Patent Application Serial No. 10-2016-0061495, which was filed in the Korean Intellectual Property Office on May 19, 2016, the entire disclosure of each of which is incorporated by herein reference.

BACKGROUND

1. Field of the Disclosure

The present disclosure relates generally to a cellular wireless communication system, and more particularly, to a scalable frame structure and a method for transmission and reception.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), Full Dimensional MIMO (FD-MIMO), array antenna, an analog beam forming, and large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, etc.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT), in which distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), etc., have been recently researched. Such an IoT environment may provide intelligent Internet technology services that create a new value to human life by collecting and analyzing data generated among connected things. IoT may be applied to a variety of fields including smart home, smart building, smart city, smart car, connected cars, smart grid, health care, smart appliances, advanced medical services, etc., through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

However, the frame structure of the existing Long-Term Evolution (LTE) and LTE-Advanced (LTE-A) systems is designed considering normal voice/data communications, and has limitations in scalability for various services and requirements like those of a 5G system. Therefore, a need exists for a flexible frame structure for use in a 5G system considering various services and requirements.

SUMMARY

The present disclosure is designed to address at least the problems and/or disadvantages described above and to provide at least the advantages described below.

Accordingly, an aspect of the present disclosure is to provide an efficient scalable frame structure for integrating and supporting various services in a mobile communication system and provision of a method and an apparatus for using the same.

Another aspect of the present disclosure is to provide a scalable frame structure that minimizes inter-symbol interference, thereby improving the system performance.

In accordance with an aspect of the present disclosure, a method is provided for transmitting signals in a wireless communication system. The method includes transmitting a first signal using a first frame structure to a first terminal; and transmitting a second signal using a second frame structure to a second terminal. A subcarrier spacing of the second frame structure is a multiple of a subcarrier spacing of the first frame structure. A length of a subframe in the first frame structure is a multiple of a length of a subframe in the second frame structure.

In accordance with another aspect of the present disclosure, a method is provided for receiving signals in a wireless communication system. The method includes receiving a first signal using a first frame structure from a base station; and receiving a second signal using a second frame structure from the base station. A subcarrier spacing of the second frame structure is a multiple of a subcarrier spacing of the first frame structure. A length of a subframe in the first frame structure is a multiple of a length of a subframe in the second frame structure.

In accordance with an aspect of the present disclosure, a base station is provided for transmitting signals in a wireless communication system. The base station includes a transceiver; and a controller configured to control the transceiver to transmit a first signal using a first frame structure to a first terminal, and to control the transceiver to transmit a second signal using a second frame structure to a second terminal. A subcarrier spacing of the second frame structure is a multiple of a subcarrier spacing of the first frame structure. A length of a subframe in the first frame structure is a multiple of a length of a subframe in the second frame structure.

In accordance with an aspect of the present disclosure, a terminal is provided for receiving signals in a wireless communication system. The terminal includes a transceiver; and a controller configured to control the transceiver to receive a first signal using a first frame structure from the base station, and to control the transceiver to receive a second signal using a second frame structure from the base station. A subcarrier spacing of the second frame structure is a multiple of a subcarrier spacing of the first frame structure. A length of a subframe in the first frame structure is a multiple of a length of a subframe in the second frame structure.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION

Figure 1:
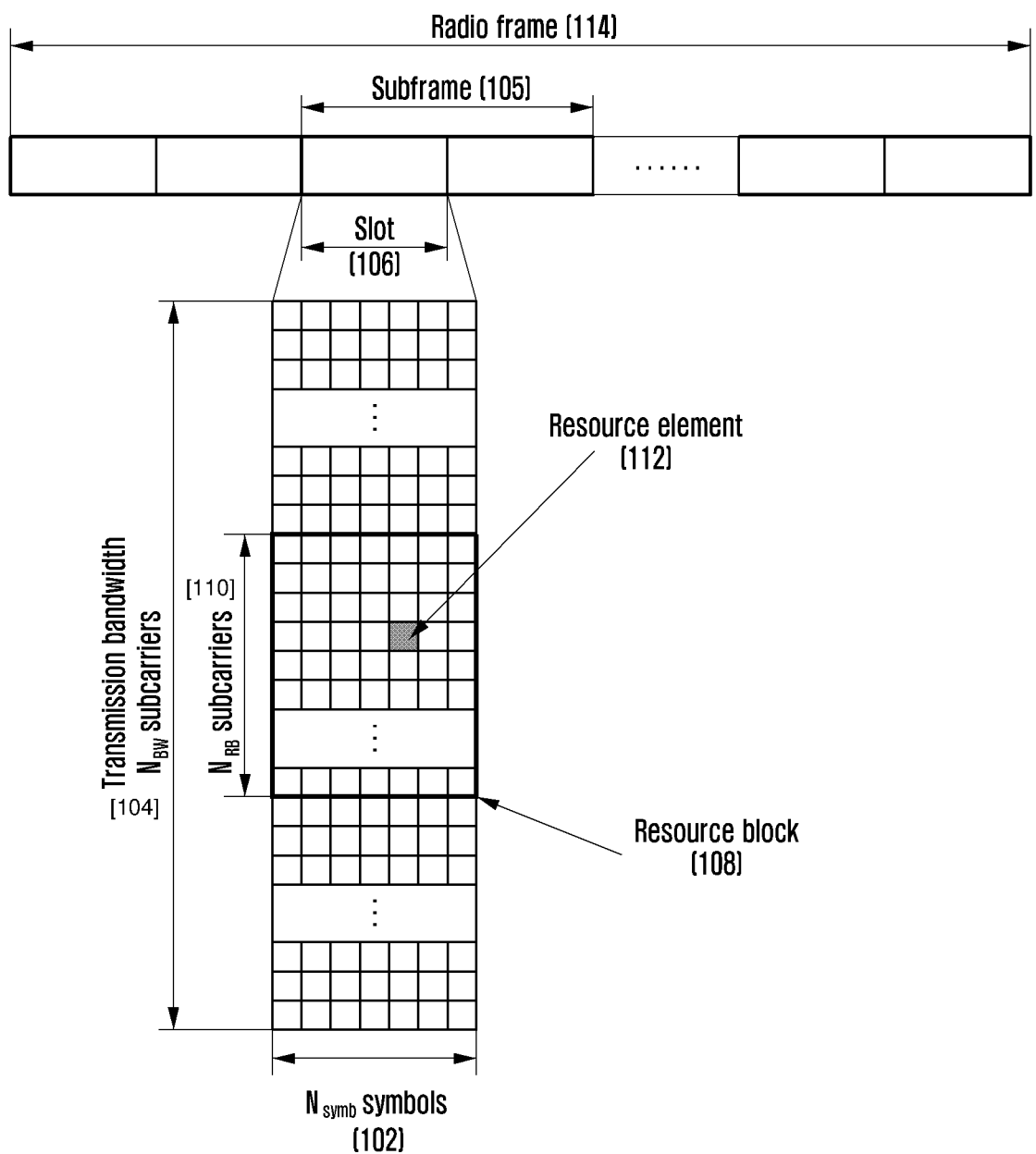
FIG. 1 illustrates a basic structure of a time-frequency domain of LTE and LTE-A systems.

Various embodiments of the present disclosure will be described in detail with reference to the accompanying drawings. In the following description, specific details such as detailed configurations and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness In each drawing, the same or similar components may be denoted by the same reference numerals.

Each block of the flow charts and combinations of the flow charts may be performed by computer program instructions. Because these computer program instructions may be mounted in processors for a general computer, a special computer, or other programmable data processing apparatuses, these instructions executed by the processors for the computer or the other programmable data processing apparatuses create means performing functions described in block(s) of the flow charts. Because these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Because the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate a modules, a segment, and/or a code including one or more executable instructions for executing a specific logical function(s). Further, functions mentioned in the blocks occur regardless of a sequence in some alternative embodiments. For example, two blocks that are consecutively illustrated may be simultaneously performed in fact or be performed in a reverse sequence depending on corresponding functions sometimes.

Herein, the term "unit" may include software and/or hardware components, such as a field-programmable gate array (FPGA) and/or an application-specific integrated circuit (ASIC). However, the meaning of "unit" is not limited to software and/or hardware. For example, a unit may be configured to be in a storage medium that may be addressed and may also be configured to reproduce one or more processor. Accordingly, a "unit" may include components such as software components, object oriented software components, class components, task components, processors, functions, attributes, procedures, subroutines, segments of program code, drivers, firmware, microcode, circuit, data, database, data structures, tables, arrays, and variables.

Functions provided in the components and the "units" may be combined with a smaller number of components and/or "units" or may further separated into additional components and/or "units".

In addition, components and units may also be implemented to reproduce one or more CPUs within a device or a security multimedia card.

The terms as used in the present disclosure are provided to describe specific embodiments, and do not limit the scope of other embodiments. It is to be understood that singular forms include plural forms unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as the contextual meanings of related technology. Unless otherwise defined, the terms should not be interpreted as ideally or excessively formal meanings. When needed, even the terms as defined in the present disclosure may not be interpreted as excluding embodiments of the present disclosure.

Herein, a base station performs resource allocation to a terminal. Examples of the base station may include an eNode B, a Node B, a wireless access unit, a base station controller, a node on a network, etc. Examples of the terminal may include a user equipment (UE), a mobile station (MS), a cellular phone, a smart phone, a computer, a multimedia system performing a communication function, etc.

Herein, a downlink (DL) is a radio transmission path of a signal from a base station to a UE and an uplink (UL) is a radio transmission path of a signal from the UE to the base station.

The embodiments of the present disclosure may be applied to other communication systems having similar technical backgrounds or channel forms.

A system transmission bandwidth per carrier of LTE and LTE-A is limited to a maximum of 20 MHz, while a 5G system is expected to provide super-high speed data services of several Gbps using an ultra-wide bandwidth, which is much wider than LTE and LTE-A. As a result, a candidate frequency for the 5G system is a very high frequency band from several GHz to 100 GHz, which is a relatively easy to secure ultra-wideband frequency.

A method of securing a wideband frequency for the 5G system is also considered by frequency reallocation or allocation in a frequency band of several hundreds of MHz to several GHz to several GHz, as used in a current mobile communication system.

A radio wave in a very high frequency band has a wavelength of several mm, and therefore, may be referred to as a millimeter wave (mmWave). However, in a very high frequency band, a pathloss of the radio wave increases in proportion to the frequency band, such that the coverage of the mobile communication system decreases.

To overcome the disadvantage of the reduction in the coverage of the very high frequency band, a beamforming technique for concentrating radiation energy of a radio wave onto a predetermined destination by using a plurality of antennas to increase an arrival distance of the radio wave is becoming more important. The beamforming technique may be applied to a transmitting end and a receiving end.

In addition to increasing the coverage by using the beamforming technique, interference is reduced in a region other than the beamforming direction.

As another requirement of the 5G system, there is an ultra-low latency service having a transmission delay of about 1 ms between the transmitting and receiving ends. By one method for reducing a transmission delay, a frame structure design based on short transmission time interval (TTI) compared to LTE and LTE-A is possible. The TTI is a basic unit for performing scheduling, and the TTI of LTE and LTE-A systems is 1 ms corresponding to a length of one subframe. For example, the short TTI to meet the requirements for the ultra-low latency service of the 5G system may be 0.5 ms, 0.2 ms, 0.1 ms, etc., that are shorter than LTE and LTE-A systems.

In the following description, unless otherwise stated, a TTI or a subframe is a basic unit of scheduling and may be interchangeably used with each other.

FIG. 1 illustrates a basic structure of a time-frequency resource domain of LTE and LTE-A systems.

Referring to FIG. 1, a horizontal axis represents a time domain and a vertical axis represents a frequency domain. A terminal transmits data or a control signal to a base station through a UL and a base station transmits data or a control signal to the terminal through a DL. A minimum transmission unit in the time domain of LTE and LTE-A systems is an orthogonal frequency division multiplexing (OFDM) symbol in the DL and a single-carrier frequency division multiple access (SC-FDMA) symbol in the UL, in which a slot 106 is formed by $N_{symb}$ symbols 102 and a subframe 105 is formed by two slots. A radio frame 114 is a time domain unit including 10 subframes. A minimum transmission unit in the frequency domain is a subcarrier in a unit of 15 kHz (subcarrier spacing is 15 kHz), and the overall system transmission bandwidth consists of a total of $N_{BW}$ subcarriers 104.

A basic unit of the resource in the time-frequency domain is a resource element (RE) 112, which may be represented by an OFDM symbol index or an SC-FDMA symbol index and a subcarrier index. A resource block (RB) 108 (or a physical resource block (PRB)) is defined by the $N_{symb}$ consecutive OFDM symbols 102 in the time domain and NRB consecutive sub-carriers 110 in the frequency domain. Therefore, the RB 108 includes $N_{symb}$×NRB REs 112.

In LTE and LTE-A systems, data is mapped in an RB unit, and a base station performs scheduling in an RB-pair unit configuring one subframe for a predetermined terminal. The number of SC-FDMA symbols or the number $N_{symb}$ of OFDM symbols is determined depending on a cyclic prefix (CP) length added to each symbol to prevent inter-symbol interference. For example, if a normal CP is applied, $N_{symb}$=7, and if an extended CP is applied, $N_{symb}$=6. The extended CP is applied to a system having a radio wave transmission distance that is relatively longer than the normal CP, thereby maintaining inter-symbol orthogonally. In addition, the CP length per symbol is additionally adjusted in order to configure one subframe with an integer number of symbols. For example, for the normal CP, a CP length of a first symbol of each slot is 5.21 μsec and a CP length of the remaining symbols of each slot is 4.69 μsec. Since the OFDM symbol length is inversely related to the subcarrier spacing, each OFDM symbol length is 1/15 kHz=66.67 μsec. If the CP length is included, the length of the first symbol of each slot is 71.88 μsec and the length of the remaining symbols of each slot is 71.36 μsec. A length $T_I$ of an I-th symbol may be expressed using Equation (1).

$$T_1 = T_{CP,l} + T_{symb} \quad (1)$$

$$T_{CP,l} = \begin{cases} 5.21 \text{ usec } (l = 0) \\ 4.69 \text{ usec } (l = 1, 2, \ldots, 6) \end{cases}$$

$$T_{symb} = \frac{1}{15 \text{ kHz}} = 66.67 \text{ usec}$$

The subcarrier spacing, the CP length, etc., are information for OFDM transmission and reception and should be recognized as a common value by the base station and the terminal to smoothly transmit and receive a signal.

Further, Nrw and NRB are proportional to the system transmission bandwidth. Accordingly, a data rate is increased in proportion to the number of RBs scheduled in the terminal.

As described above, an operating frequency band of the 5G system ranges from hundreds of MHz to 100 GHz. Therefore, it is difficult to transmit and receive signals suitable for the channel environment for each frequency band by operating a single frame structure over the entire frequency band. That is, there is a need for efficient signal transmission and reception by operating a frame structure in which subcarrier spacing is defined in accordance with the subdivision of the operating frequency band. For example, in a high frequency band, it is desirable to keep the subcarrier spacing relatively large in order to overcome performance deterioration due to phase noise. In addition to the operating frequency band, a cell size may also be a primary consideration defining the frame structure. For example, when the cell size is large, it is preferable to apply a relatively long CP length in order to avoid the inter-symbol interference due to a multi-path propagation signal. Herein, for convenience of explanation, the frame structure defined according to various scenarios, such as the operating frequency band and the cell size, will be referred to as a scalable frame structure.

An aspect of the present disclosure is to define parameter sets for a scalable frame structure for each operating scenario and to maintain compatibility between the parameter sets for efficient system operation. The parameter set includes subcarrier spacing, a CP length, etc., and the operating scenario may be defined according to service types such as an operating frequency band, a cell size, enhanced mobile broadband (eMBB), ultra-reliable low latency communications (URLLC), and a massive MTC.

Figure 2A:
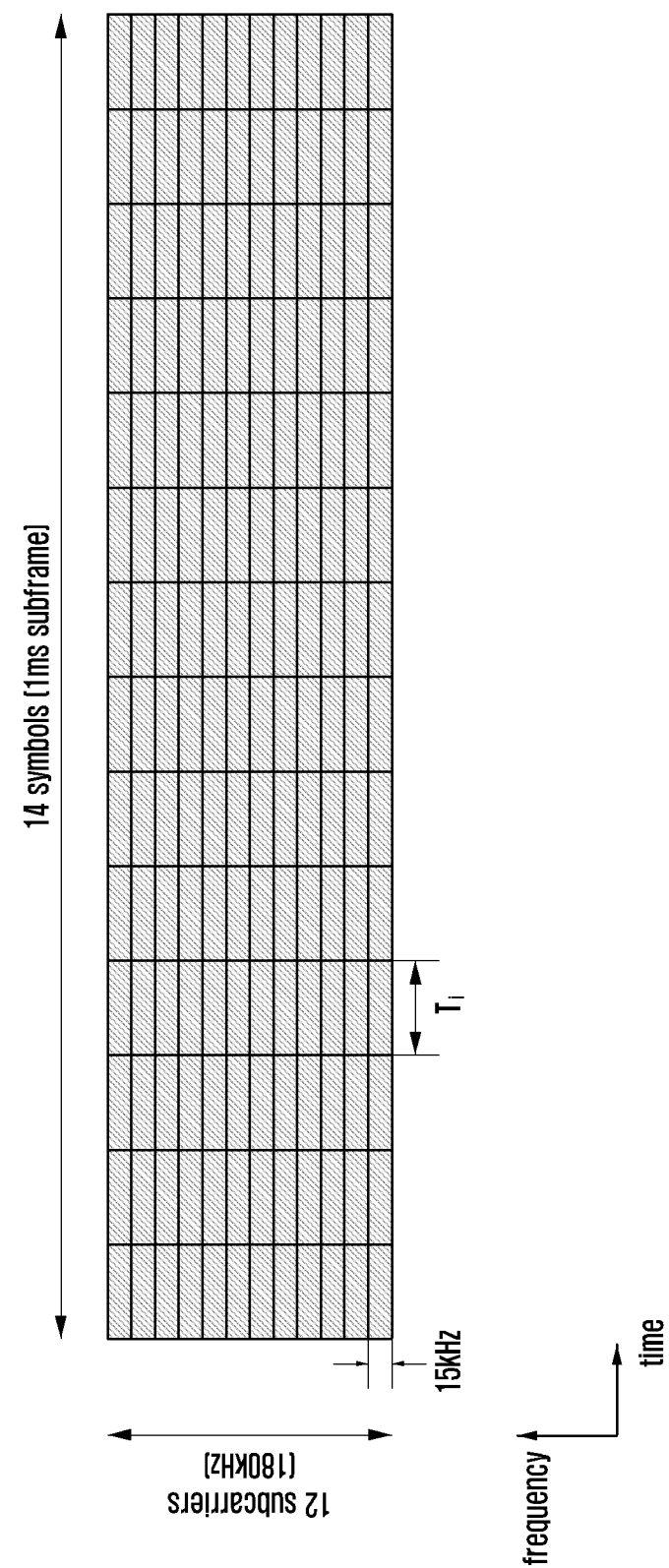
FIGS. 2A, 2B and 2C illustrate a scalable frame structure according to an embodiment of the present disclosure.
Figure 2B:
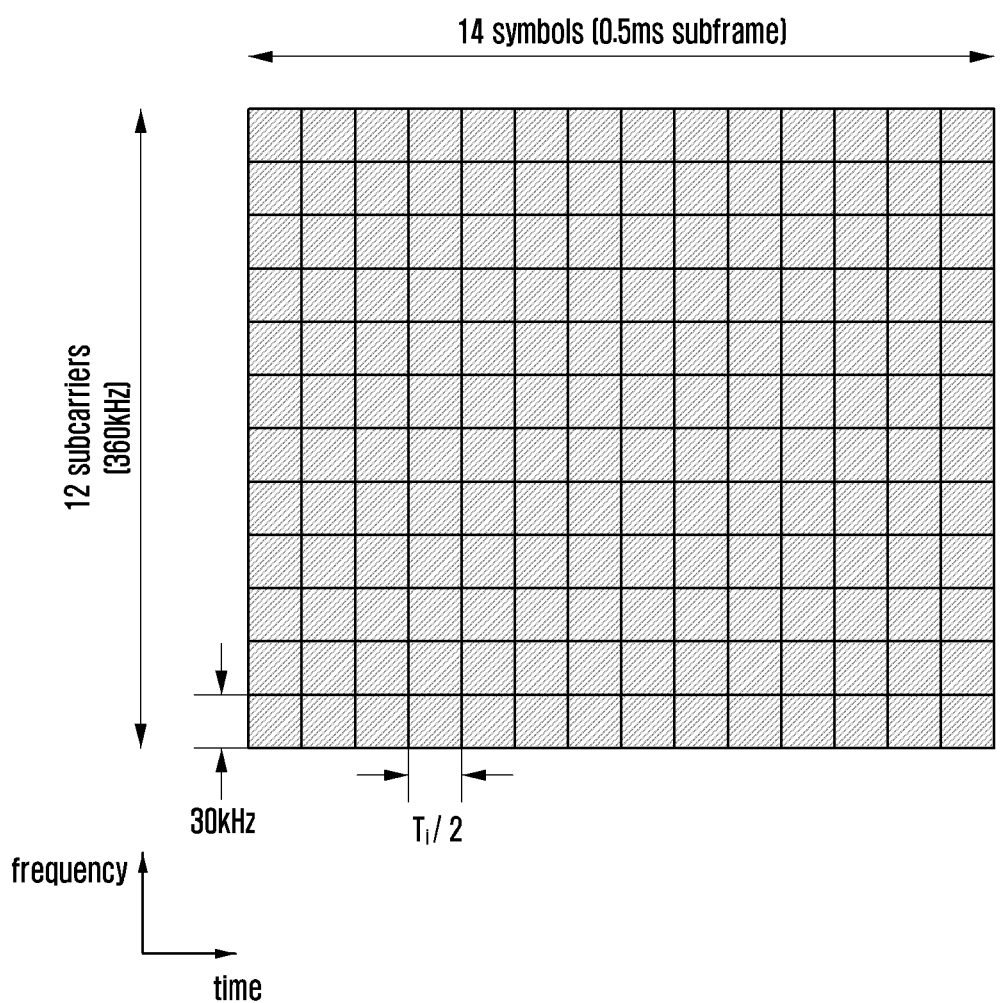
Figure 2C:
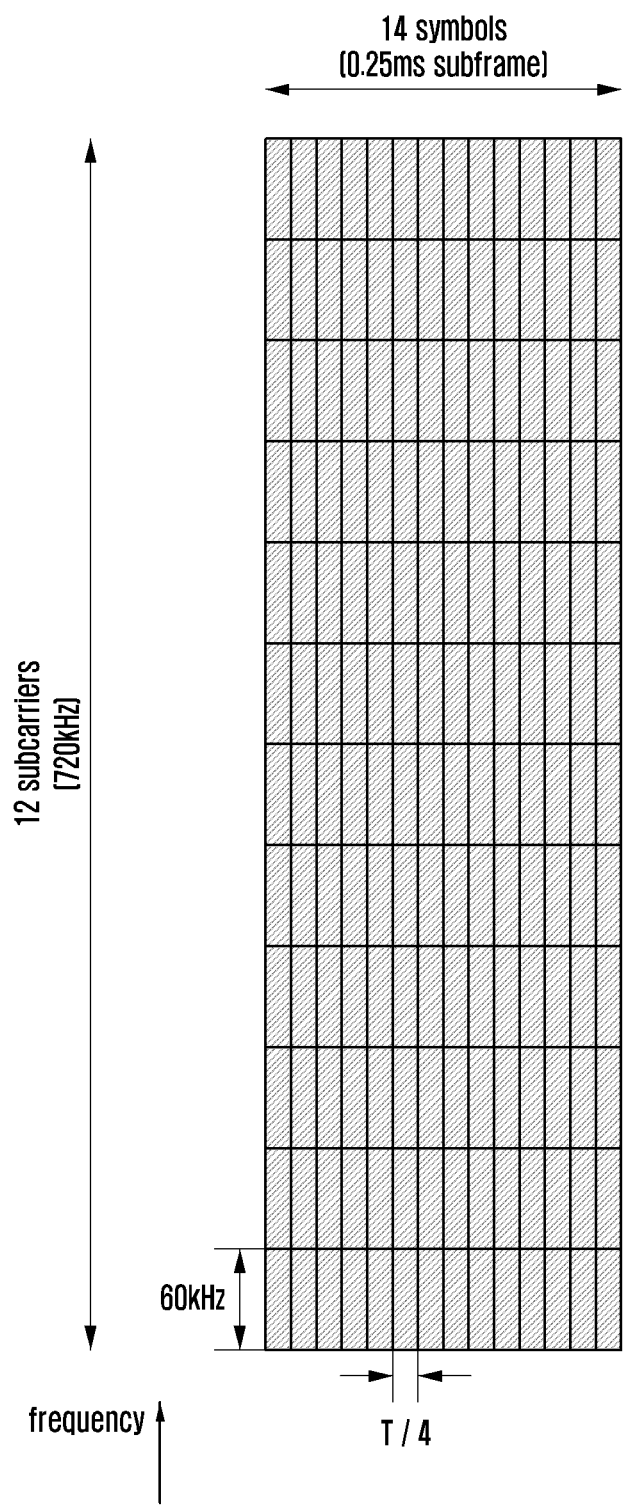

FIGS. 2A, 2B, and 2C illustrate a scalable frame structure according to an embodiment of the present disclosure.

In FIGS. 2A to 2C, the parameter sets defining the scalable frame structure include a subcarrier spacing, a CP length, a length of the subframe, etc.

It is expected that LTE/LTE-A systems and the 5G systems will initially coexist or operate in a dual mode. Therefore, a scalable frame structure of the 5G system should include at least the frame structure of LTE and LTE-A or the parameter sets.

FIG. 2A illustrates a 5G frame structure or parameter sets, such as the frame structure of LTE and LTE-A. Referring to FIG. 2A, in a frame structure type A, a subcarrier spacing is 15 kHz, 14 symbols configure a 1 ms subframe, and 12 subcarriers (=180 kHz=12×15 kHz) configure a PRB.

Referring to FIG. 2B, in a frame structure type B, a subcarrier spacing is 30 kHz, 14 symbols configure a 0.5 ms subframe, and 12 subcarriers (=360 kHz=12×30 kHz) configure a PRB. Therefore, the subcarrier spacing and the PRB size are twice as larger as those of the frame structure type A, and the length of the subframe and the length of the symbol are twice as short as those of the frame structure type A.

Referring to FIG. 2C, in a frame structure type C, a subcarrier spacing is 60 kHz, 14 symbols configure a 0.25 ms subframe, and 12 subcarriers (=720 kHz=12×60 kHz) configure a PRB. Therefore, the subcarrier spacing and the PRB size are four times as large as those of the frame structure type A, and the length of the subframe and the length of the symbol are four times as long as those of the frame structure type A.

If the frame structure type is generalized, the subcarrier spacing, the CP length, and the length of the subframe, which make up the parameter sets, have an integer multiple relationship with each other for each type, such that high scalability may be provided. In addition, as with characteristics of LTE frame structure, the CP length of some symbols in the subframe may differ from the CP length of the remaining symbols in the subframe under the determined frame structure.

The above-mentioned frame structure type may be applied corresponding to various scenarios. From the viewpoint of cell size, it is possible to support a cell having a larger size as the CP length is increased, such that the frame structure type A may support cells relatively larger than the frame structure types B and C. From the viewpoint of operating frequency band, as subcarrier spacing increases, it is more advantageous in restoring the phase noise in the high frequency band, such that the frame structure type C may support a relatively higher operating frequency than the frame structure types A and B. From the viewpoint of services, to support an ultra-low delay service like URLLC, it is advantageous to make the length of the subframe shorter, and therefore, the frame structure type C is relatively more suitable for the URLLC service over the frame structure types A and B.

In addition, a scenario for multiplexing the frame structure types in one system and integrally operating them may be considered.

Figure 3:
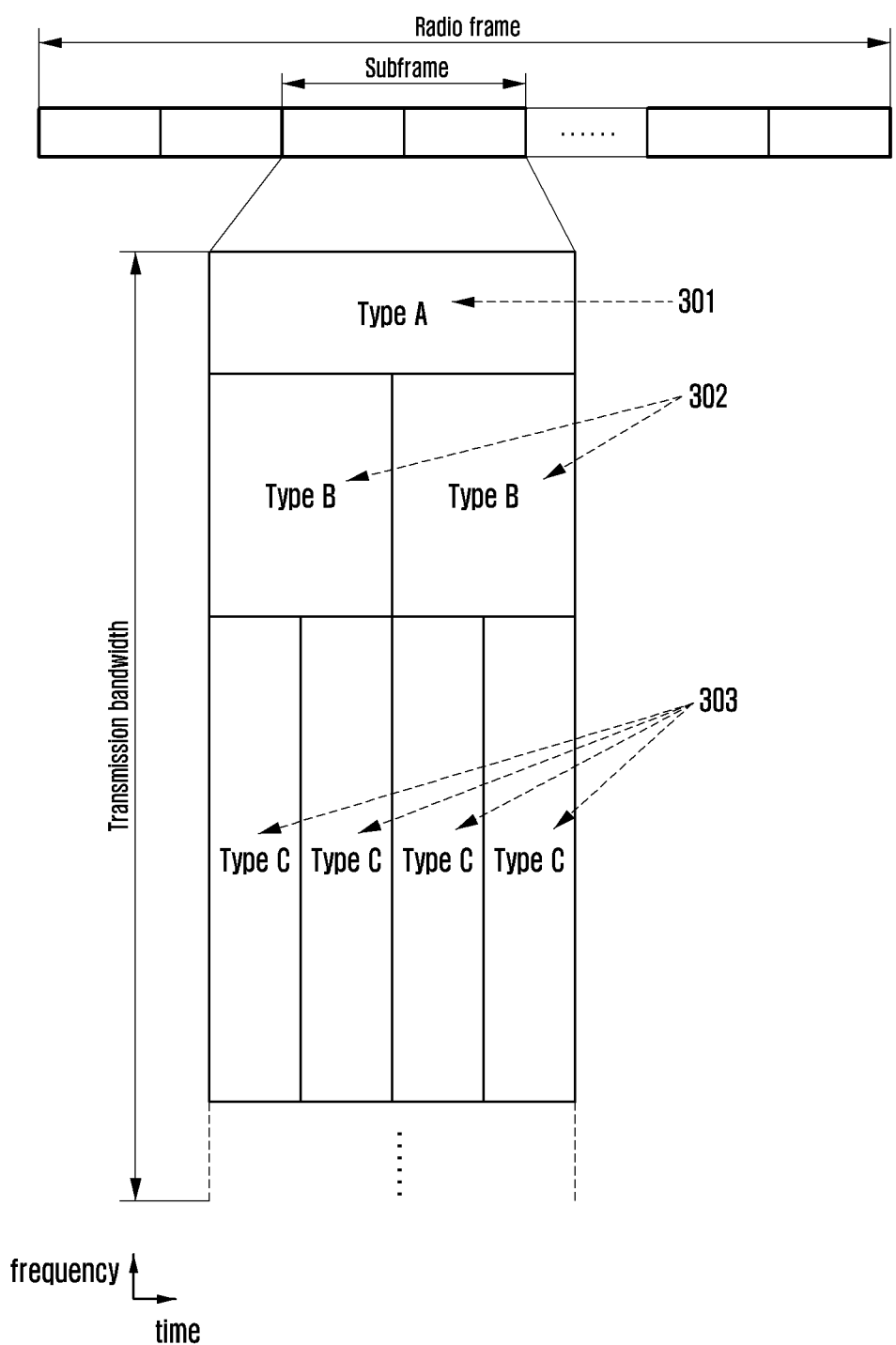
FIG. 3 illustrates multiplexing a scalable frame structure according to an embodiment of the present disclosure.

FIG. 3 illustrates frame structure types A, B, and C multiplexed in one system according to an embodiment of the present disclosure.

Referring to FIG. 3, type A 301, type B 302, and type C 303 are multiplexed in one system. That is, by maintaining an integer multiple relationship between the essential parameter sets defining the frame structure type, resource mapping in a subframe or in the PRB is smoothly performed, even when multiplexing as illustrated in FIG. 3.

For an initial access of a terminal, a physical broadcast channel (PBCH) for providing control information for the initial access, such as time-frequency synchronization with the system, a synchronization signal for providing a cell ID, and system bandwidth information, a physical random access channel (PRACH) for random access of a terminal may be used. However, in a 5G system supporting various frame structure types as described above, the frame structure type to be applied to an initial access channel, such as the synchronization signal, the PBCH, and the PRACH, should be defined.

In the present disclosure, in a 5G system supporting various frame structure types as described above, two methods are defined for an initial access operation of a terminal. In a first method, the initial access channel may be defined for each frame structure type. In a second method, a common initial access channel may be defined.

Figure 4:
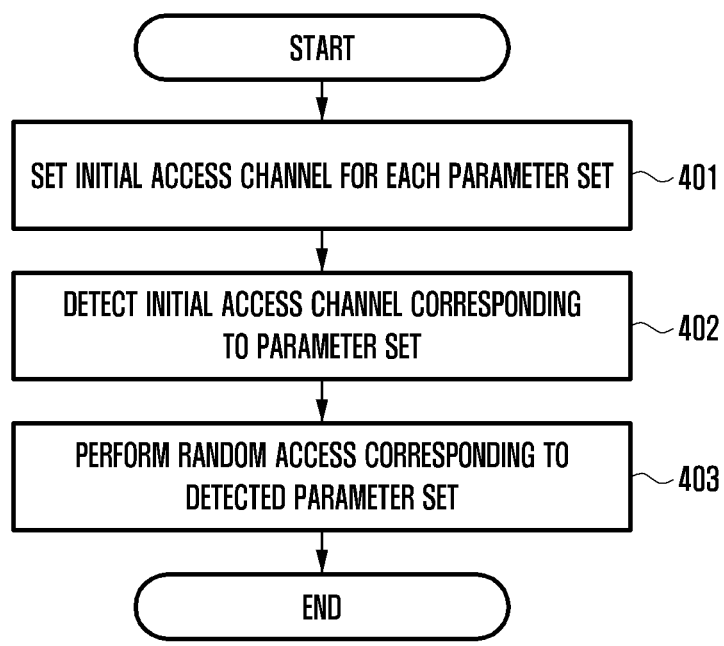
FIG. 4 is a flow chart illustrating an initial access procedure between a base station and a terminal according to an embodiment of the present disclosure.

FIG. 4 is a flow chart illustrating operations of the base station and the terminal according to the first method.

Referring to FIG. 4, in step 401, the base station sets channels for initial access for each parameter set or each frame structure type and transmits them to the each terminal. For example, in a system supporting all the frame structure types A, B, and C, the base station maps the channels for initial access, each applied with the frame structure types A, B, and C, to a separate time-frequency resource and transmits them.

In step 402, the terminal detects the initial access channel depending on the parameter set or the frame structure type supported by the terminal. If the terminal fails to detect the initial access channel in step 402, the terminal repeatedly performs the operation of step 402.

In step 403, the terminal performs a random access using a random access channel corresponding to the parameter set or the frame structure type successfully detected by the terminal in step 402.

Figure 5:
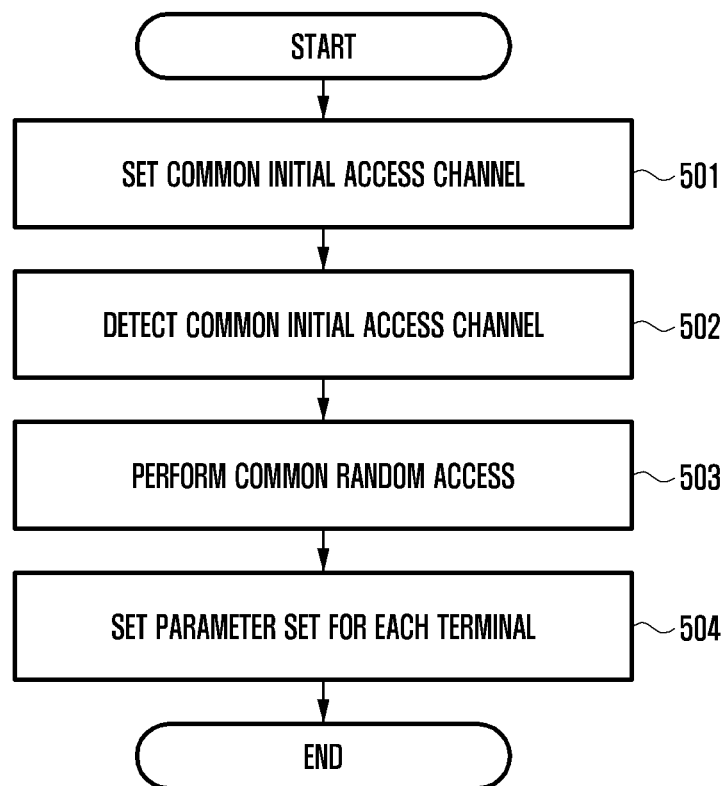
FIG. 5 is a flow chart illustrating an initial access procedure between a base station and a terminal according to an embodiment of the present disclosure.

FIG. 5 is a flowchart illustrating operations of the base station and the terminal according to the second method.

Referring to FIG. 5, in step 501, the base station sets the initial access channel independent of the parameter set or the frame structure type, and transmits it to the terminal.

In step 502, the terminal detects a common initial access channel. If the terminal fails to detect the common initial access channel in step 502, the terminal repeatedly performs step 502.

In step 503, the terminal performs the random access using the common initial access channel.

The base station receives the random access attempt over the common initial access channel of the terminal, and sets a parameter set or a frame structure type to be applied to signal transmission/reception between the terminal and the base station in step 504.

Figure 6:
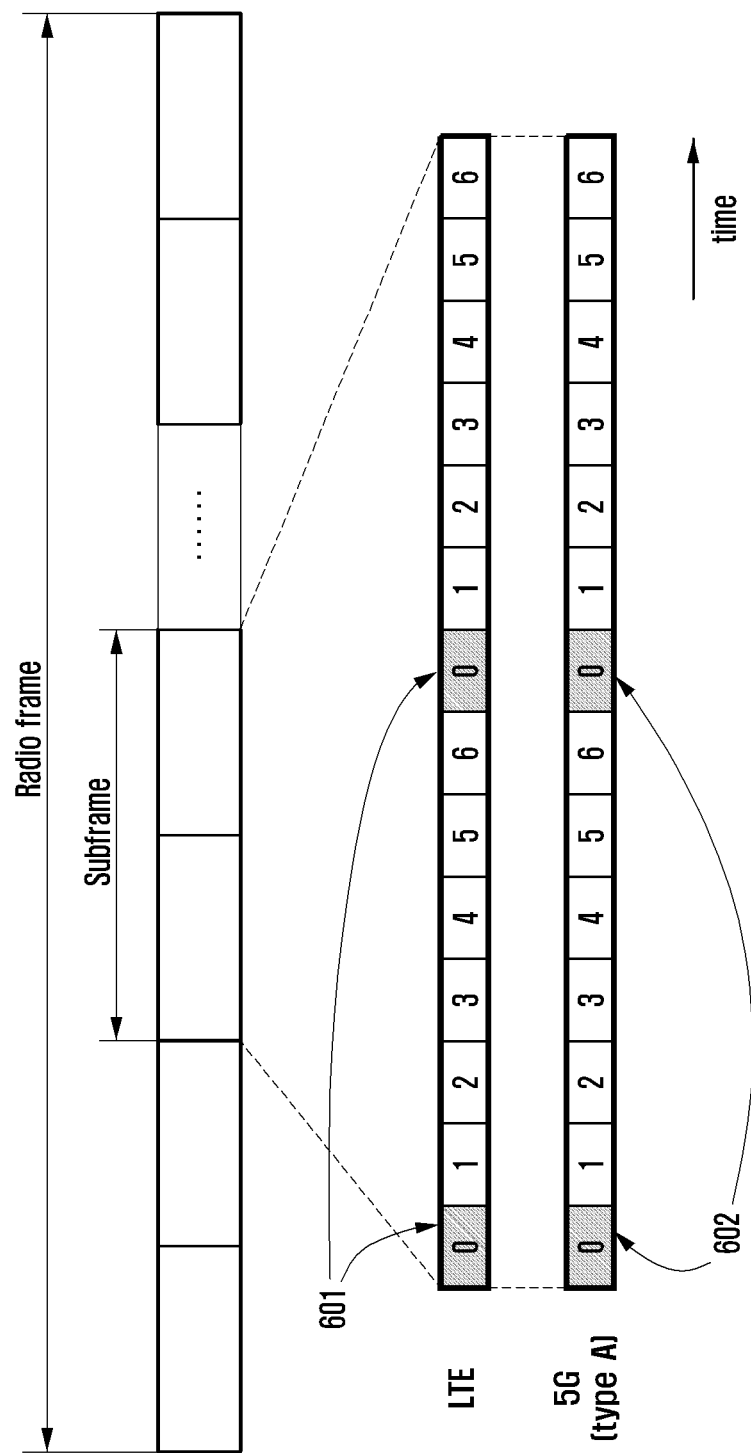
FIG. 6 illustrates a coexistence relationship between a frame structure type A and LTE in the time domain according to an embodiment of the present disclosure.

FIG. 6 illustrates a coexistence relationship between a frame structure type A and LTE in the time domain according to an embodiment of the present disclosure.

Referring to FIG. 6, because the frame structure type A is the same as that of LTE frame structure, the 5G system is synchronized with LTE system in a subframe unit and in a symbol unit in subframes. In particular, for LTE, a CP length 601 of a first symbol #0 of each slot is longer than the CP length of the remaining symbols #1 to #6 in the slot and the frame structure type A is likewise applied with the above structure 602, such that the inter-symbol synchronization between LTE system and the 5G system is achieved.

Therefore, if a cell A is applied with LTE system and a cell B, which is a neighbor to the cell A, is applied with the 5G system to which the frame structure type A is applied, as illustrated in FIG. 6, the symbol of LTE is time synchronized with the symbol of the 5G, such that it is possible to minimize inter-cell interference caused by a mismatch of the time synchronization. A length $T_{typeA,l}$ of a symbol of the I-th symbol of each slot in the subframe of the frame structure type A subframe may be expressed by Equation (2), which is similar to Equation (1).

$$T_l = T_{CP,l} + T_{symb}, \quad (2)$$

$$T_{CP,l} = \begin{cases} 5.21 \text{ usec } (l = 0) \\ 4.69 \text{ usec } (l = 1, 2, \ldots, 6) \end{cases},$$

$$T_{symb} = \frac{1}{15 \text{ kHz}} = 66.67 \text{ usec}$$

Table 1 below shows a CP length of an I-th symbol of each slot in a subframe of the frame structure type A, a length of the symbol from which the CP is excluded, and a length of the symbol including the CP in a unit of μsec.

TABLE 1

| | CP Length | Length of symbol (excluding CP) | Length of symbol (including CP) |
|---|---|---|---|
| Frame structure type A | 5.21 μsec (l = 0) 4.69 μsec (l = 1, 2, . . . , 6) | 66.67 μsec | 71.88 μsec (l = 0) 71.35 μsec (l = 1, 2, . . . , 6) |

Table 2 below shows a CP length of the I-th symbol of each slot in the subframe of the frame structure type A, a length of the symbol from which the CP is excluded, and a length of the symbol including the CP in a unit of Ts that represents the time domain (where various Ts values are assumed). Ts is in the relationship of Ts=1/(subcarrier spacing×fast Fourier transform (FFT) size), depending on the subcarrier spacing and the maximum FFT size assumed in the system. For an LTE system, Ts=1/(15000×2048) sec is applied.

TABLE 2

| Ts | CP length | Length of symbol (excluding CP) | Length of symbol (including CP) |
|---|---|---|---|
| Ts = 1/(15000 × 2048) sec | 160 Ts (l = 0) 144 Ts (l = 1, 2, . . . , 6) | 2048 Ts | 2208 Ts (l = 0) 2192 Ts (l = 1, 2, . . . , 6) |
| Ts = 1/(15000 × 4096) sec | 320 Ts (l = 0) 288 Ts (l = 1, 2, . . . , 6) | 4096 Ts | 4416 Ts (l = 0) 4384 Ts (l = 1, 2, . . . , 6) |
| Ts = 1/(15000 × 8192) sec | 640 Ts (l = 0) 576 Ts (l = 1, 2, . . . , 6) | 8192 TS | 8832 Ts (l = 0) 8768 Ts (l = 1, 2, . . . , 6) |

Figure 7:
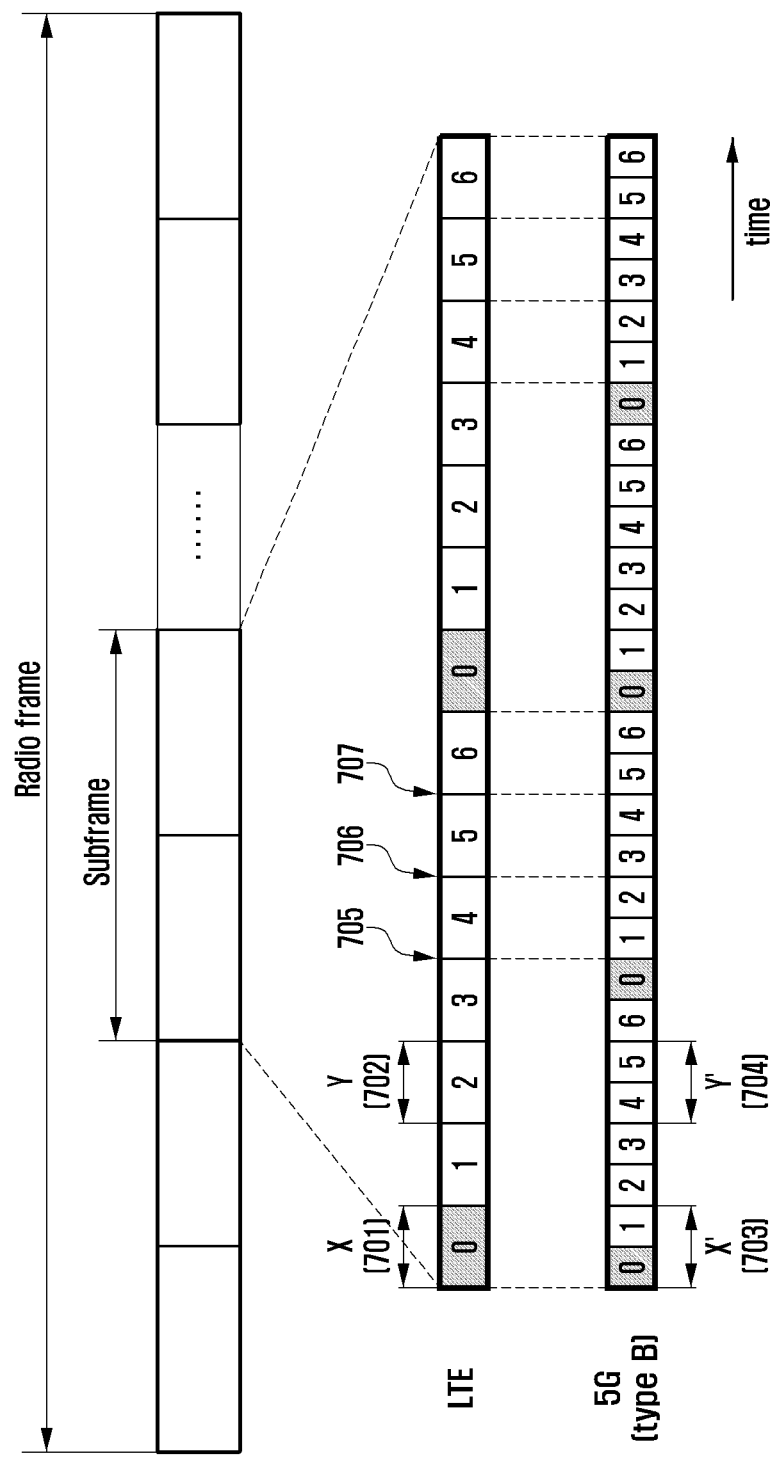
FIG. 7 illustrates a coexistence relationship between a frame structure type B and LTE in the time domain according to an embodiment of the present disclosure.

FIG. 7 illustrates a coexistence relationship between a frame structure type B and LTE in the time domain according to an embodiment of the present disclosure.

Referring to FIG. 7, in the frame structure type B, because the length of the symbol and the length of the subframe are reduced by two as compared to LTE, a 1 ms subframe of LTE corresponds to two 0.5 ms subframes of the 5G. Therefore, a 0.5 ms subframes of the 5G may be time synchronized with a 0.5 ms slot of LTE, or two 1 ms subframes of the 5G may be synchronized with a 1 ms subframe of LTE. However, two symbols of the 5G system are not necessarily synchronized with one symbol of an LTE system. For example, a length Y 702 of symbol #2 of an LTE system is equal to a sum Y' 704 of the lengths of symbols #4 and #5 of the 5G system, but a length X 701 of symbol #0 of the LTE system is longer than a sum X' 703 of symbols #0 and #1 of the 5G system because the length of the first symbol of each slot in the LTE subframe is longer than the length of remaining symbols.

A length $T_{typeB,l}$ of a symbol of the I-th symbol of each slot in the subframe of the frame structure type B may be expressed by Equation (3).

$$T_{typeB,l} = \frac{T_{CP,l}}{2} + \frac{T_{symb}}{2}, \quad (3)$$

$$T_{typeB,0} + T_{typeB,1} =$$

-continued $$\left(\frac{T_{CP,0}}{2} + \frac{T_{symb}}{2}\right) + \left(\frac{T_{CP,1}}{2} + \frac{T_{symb}}{2}\right) = \frac{T_{CP,0} + T_{CP,1}}{2} + T_{symb} < T_{typeA,0}$$

$$T_{CP,l} = \begin{cases} 5.21 \text{ usec } (l = 0) \\ 4.69 \text{ usec } (l = 1, 2, \ldots, 6) \end{cases},$$

$$T_{symb} = \frac{1}{15 \text{ kHz}} = 66.67 \text{ usec}$$

Referring to Equation (3) and FIG. 7, the lengths of the X 701 and the X'703 do not match each other, even if the subframe of the LTE system is time synchronized with the subframe of the 5G system. As a result, two symbols of the 5G system are time synchronized with one symbol of LTE only after a start point 705 of the first slot of the LTE symbol (705, 706, and 707). Therefore, a mutual interference problem may still occur between LTE and a 5G system due to the time synchronization mismatch, before reference numeral 705.

For example, in the LTE system, the subframe performs DL transmission for the symbols #0, #1, and #2. If the URLLC data burst is transmitted as the UL in one symbol in the symbol #4 of the 5G system, the UL transmission in the symbol #4 of the 5G system acts as the interference over the symbols #1 and #2 of the LTE system due to the mismatch of the time synchronization. However, if the time synchronization is made, the UL transmission in the symbol #4 of the 5G system is limited only to the symbol #2 of the LTE system, and thus, acts as interference.

The above problem may likewise occur when the 5G system using the frame structure type A and the 5G system using the frame structure type B coexist.

Accordingly, to reduce the interference problem between the LTE system and the 5G system, a frame structure type B' is defined, wherein a length $T_{typeB',l}$ of a symbol of the I-th symbol of each slot in the subframe of the frame structure type B' may expressed by Equation (4).

$$T_{typeB',l} = \begin{cases} \text{if } l = 0 \text{ and even slot,} & \frac{T_{CP,0}}{2} + \frac{T_{CP,0} - T_{CP,1}}{2} + \frac{T_{symb}}{2} \\ \text{otherwise,} & \frac{T_{CP,1}}{2} + \frac{T_{symb}}{2} \end{cases}, \quad (4)$$

$$T_{typeB',0} + T_{typeB',1} = \left(\frac{T_{CP,0}}{2} + \frac{T_{CP,0} - T_{CP,1}}{2} + \frac{T_{symb}}{2}\right) + \left(\frac{T_{CP,1}}{2} + \frac{T_{symb}}{2}\right) =$$

$$T_{CP,0} + T_{symb} = T_{typeA,0}$$

$$T_{CP,l} = \begin{cases} 5.21 \text{ usec } (l = 0) \\ 4.69 \text{ usec } (l = 1, 2, \ldots, 6) \end{cases}$$

Figure 8:
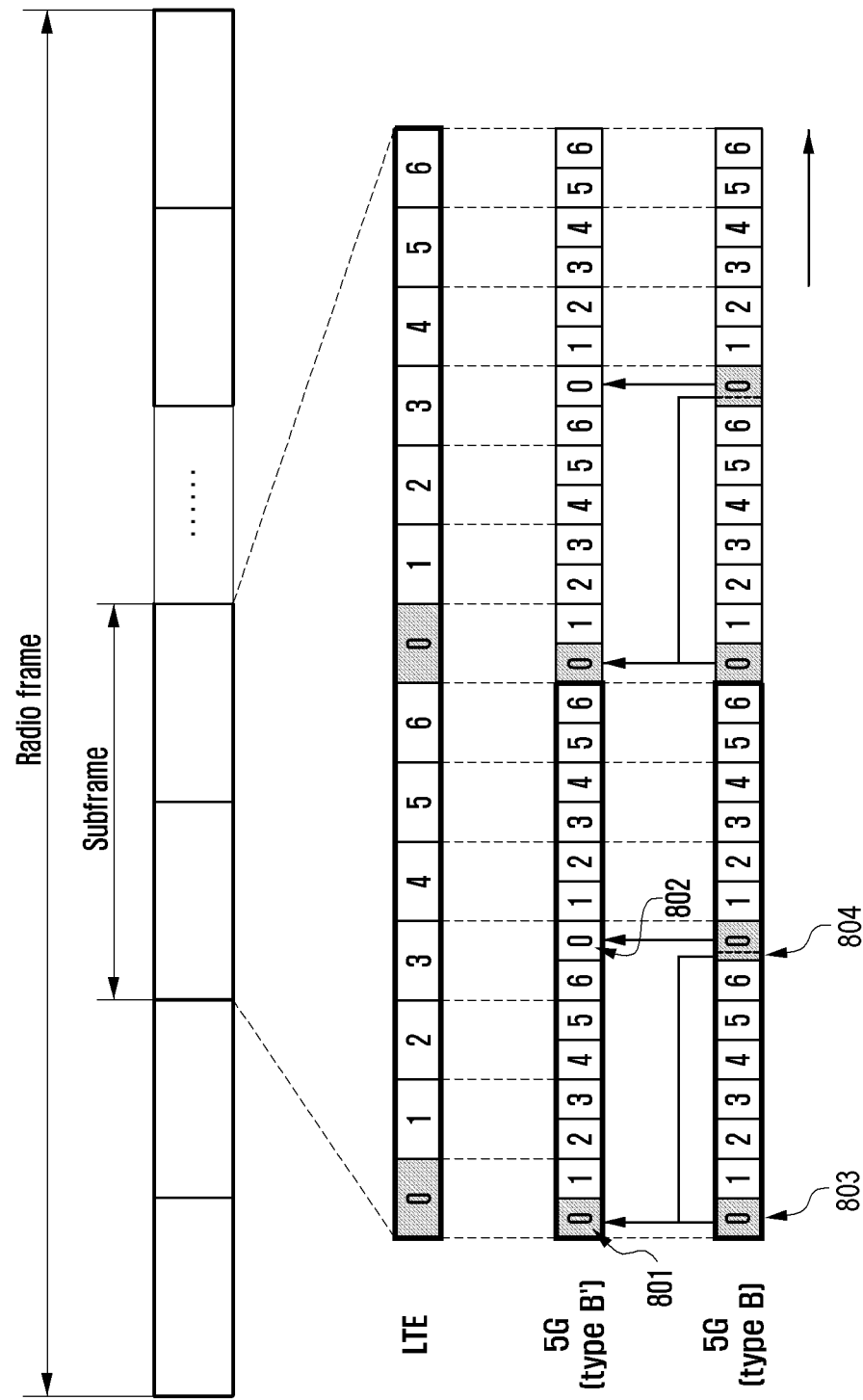
FIG. 8 illustrates a frame structure type B' according to an embodiment of the present disclosure.

FIG. 8 illustrates a frame structure type B' according to an embodiment of the present disclosure.

Referring to FIG. 8, a CP length 801 of symbol #0 of a first slot (even-numbered slot slot #0) in a subframe in the frame structure type B' is equal to a sum of a CP length 803 of symbol #0 of the frame structure type B and a difference 804 between CP lengths of the symbol #0 and other symbols. Further, a CP length 802 of symbol #0 of a second slot in the subframe is equal to the CP length of the remaining symbols #1 to #6. Therefore, the two symbols of the frame structure type B' are time synchronized with one symbol of the LTE system. Referring to FIG. 8, the CP length of the first symbol arriving every 0.5 ms is relatively longer than the CP length of the remaining symbols.

Figure 9:
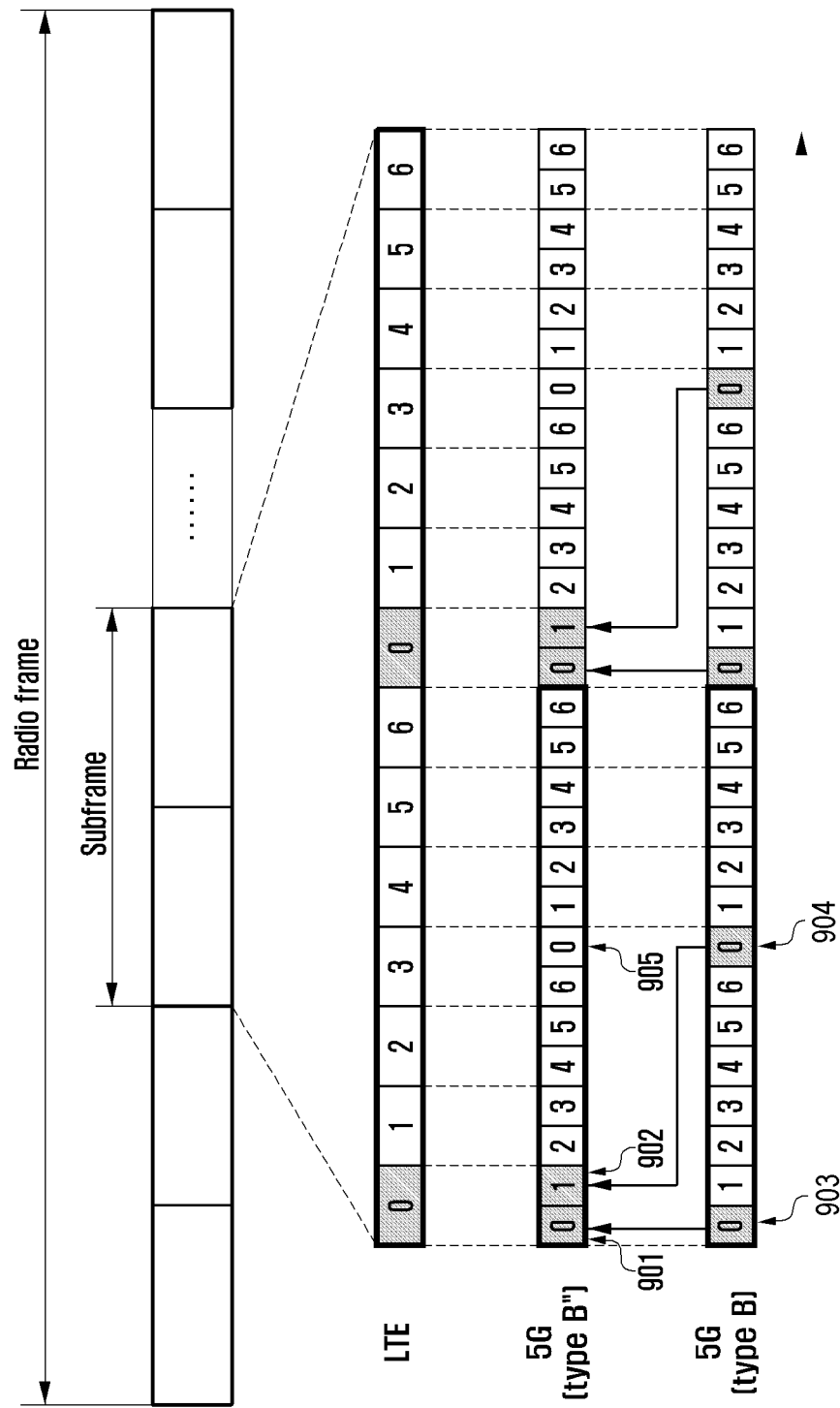
FIG. 9 illustrates a frame structure type B" according to an embodiment of the present disclosure.

FIG. 9 illustrates a frame structure type B" according to an embodiment of the present disclosure.

Referring to FIG. 9, CP lengths 901 and 902 of symbols #0 and #1 of a first slot (even-numbered slot, slot #0) in a subframe in the frame structure type B' are equal to CP lengths 903 and 904 of symbol #0 of the frame structure type B. By arranging two symbols 901 and 902 having a relatively long CP length at the head of the subframe, the sum of the lengths of the two symbols 901 and 902 is equal to the symbol #0 of the LTE subframe, and therefore, time synchronization is possible. Further, a CP length 905 of symbol #0 of a second slot in the subframe is equal to the CP length of the remaining symbols #2 to #6. Therefore, the two symbols of the frame structure type B" are time synchronized with one symbol of the LTE system.

Referring to FIG. 9, the CP lengths of the first and second symbols arriving every 0.5 ms are relatively longer than the CP length of the remaining symbols.

A length $T_{typeB'',l}$ of a symbol of the I-th symbol of each slot in the subframe of the frame structure type B" may be expressed by Equation (5).

$$T_{typeB'',l} = \begin{cases} \text{if } l = 0, 1 \text{ and even slot,} & \frac{T_{CP,0}}{2} + \frac{T_{symb}}{2} \\ \text{otherwise,} & \frac{T_{CP,1}}{2} + \frac{T_{symb}}{2} \end{cases}, \quad (5)$$

$$T_{typeB'',0} + T_{typeB'',1} =$$

$$\left(\frac{T_{CP,0}}{2} + \frac{T_{symb}}{2}\right) + \left(\frac{T_{CP,1}}{2} + \frac{T_{symb}}{2}\right) = T_{CP,0} + T_{symb} = T_{typeA,0},$$

$$T_{CP,l} = \begin{cases} 5.21 \text{ usec } (l = 0) \\ 4.69 \text{ usec } (l = 1, 2, \ldots, 6) \end{cases},$$

$$T_{symb} = \frac{1}{15 \text{ kHz}} = 66.67 \text{ usec}$$

Table 3 below shows a CP length of the I-th symbol of each slot in the subframe of the frame structure type B' and the frame structure type B", a length of the symbol from which the CP is excluded, and a length of the symbol including the CP in a unit of μsec.

TABLE 3

|  | CP length | Length of symbol (excluding CP) | Length of symbol (including CP) |
|---|---|---|---|
| Frame structure type B' | 2.87 μsec (l = 0, and even slot) 2.34 μsec (besides the condition) | 33.33 μsec | 36.20 μsec (l = 0, and even slot) 35.68 μsec (besides the condition) |
| Frame structure type B" | 2.61 μsec (l = 0, 1, and even slot) 2.34 μsec (besides the condition) | 33.33 μsec | 35.94 μsec (l = 0, 1, and even slot) 35.68 μsec (besides the condition) |

Table 4 below shows a CP length of the I-th symbol of each slot in the subframe of the frame structure type B', a length of the symbol from which the CP is excluded, and a length of the symbol including the CP in a unit of Ts that represents the time domain (where various Ts values are assumed).

TABLE 4

| Ts | CP length | Length of symbol (excluding CP) | Length of symbol (including CP) |
|---|---|---|---|
| Ts = 1/ (30000 × 2048) sec | 176 Ts (l = 0, and even slot) 144 Ts (besides the condition) | 2048 Ts | 2224 Ts (l = 0, and even slot) 2192 Ts (besides the condition) |
| Ts = 1/ (30000 × 4096) sec | 352 Ts (l = 0, and even slot) 288 Ts (besides the condition) | 4096 Ts | 4448 Ts (l = 0, and even slot) 4384 Ts (besides the condition) |
| Ts = 1/ (30000 × 8192) sec | 704 Ts (l = 0, and even slot) 576 Ts (besides the condition) | 8192 Ts | 8896 Ts (l = 0, and even slot) 8768 Ts (besides the condition) |

Table 5 below shows a CP length of the I-th symbol of each slot in the subframe of the frame structure type B", a length of the symbol from which the CP is excluded, and a length of the symbol including the CP in a unit of Ts that represents the time domain (where various Ts values are assumed).

TABLE 5

| Ts | CP length | Length of symbol (excluding CP) | Length of symbol (including CP) |
|---|---|---|---|
| Ts = 1/ (30000 × 2048) sec | 160 Ts (l = 0, 1, and even slot) 144 Ts (besides the condition) | 2048 Ts | 2208 Ts (l = 0, 1, and even slot) 2192 Ts (besides the condition) |
| Ts = 1/ (30000 × 4096) sec | 320 Ts(l = 0, 1, and even slot) 288 Ts (besides the condition) | 4096 Ts | 4416 Ts (l = 0, 1, and even slot) 4384 Ts (besides the condition) |
| Ts = 1/ (30000 × 8192) sec | 640 Ts (l = 0, 1, and even slot) 576 Ts (besides the condition) | 8192 Ts | 8832 Ts (l = 0, 1, and even slot) 8768 Ts (besides the condition) |

Figure 10:
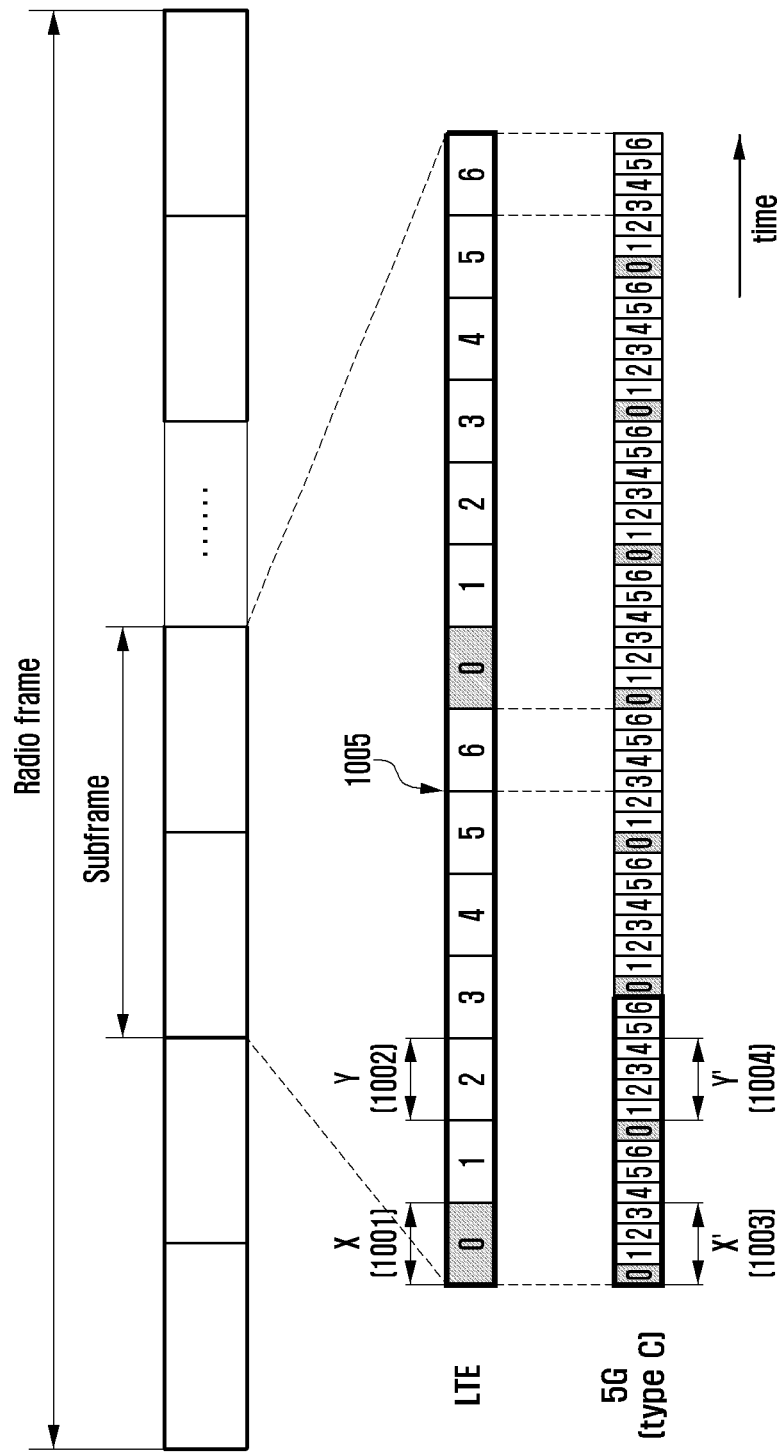
FIG. 10 illustrates a coexistence relationship between a frame structure type C and LTE in the time domain according to an embodiment of the present disclosure.

FIG. 10 illustrates a coexistence relationship between a frame structure type C and LTE in the time domain according to an embodiment of the present disclosure. Specifically, FIG. 10 illustrates a coexistence relationship with LTE in the time domain when the frame structure type C is applied to a 5G system.

Referring to FIG. 10, if the frame structure type C has a length of a symbol and a subframe reduced by four times compared to LTE, 1 ms subframe of LTE corresponds to four 0.25 ms subframes (subframe #0, #1, #2, and #3) of the 5G system. Therefore, four 1 ms subframes of the 5G are time synchronized with one 1 ms subframe of the LTE subframe. However, four symbols of the 5G system are not necessarily time synchronized with one symbol of the LTE system. For example, a length Y 1002 of symbol #2 of the LTE system is equal to a sum Y' 1004 of lengths of symbols #1, #2, #3, and #5 of a second slot of the 5G system, but a length X 1001 of symbol #0 of the LTE system is longer than a sum X' 1003 of symbols #0, #1, #2, and #3 of the 5G system because the length of the first symbol of each slot in the LTE subframe is longer than the length of remaining symbols.

Referring to FIG. 10, one symbol of LTE is time synchronized with four symbols of the 5G system at a start point 1005 of symbol #6 of a first slot of the LTE system. Therefore, the mutual interference problem may occur between LTE and a 5G system due to the time synchronization mismatch, before symbol #6 1005 of the first slot of the LTE system.

A length $T_{typeC,l}$ of a symbol of the I-th symbol of each slot in the subframe of the frame structure type C may be expressed by Equation (6).

$$T_{typeC,l} = \frac{T_{CP,l}}{4} + \frac{T_{symb}}{4}, \quad (6)$$

$$T_{typeC,0} + T_{typeC,1} + T_{typeC,2} + T_{typeC,3} =$$

$$\left(\frac{T_{CP,0}}{4} + \frac{T_{symb}}{4}\right) + \left(\frac{T_{CP,1}}{4} + \frac{T_{symb}}{4}\right) + \left(\frac{T_{CP,2}}{4} + \frac{T_{symb}}{4}\right) + \left(\frac{T_{CP,3}}{4} + \frac{T_{symb}}{4}\right) =$$

$$\frac{T_{CP,0} + T_{CP,1} + T_{CP,2} + T_{CP,3}}{4} + T_{symb} < T_{typeA,0}$$

$$T_{CP,l} = \begin{cases} 5.21 \text{ usec } (l = 0) \\ 4.69 \text{ usec } (l = 1, 2, \ldots, 6) \end{cases},$$

$$T_{symb} = \frac{1}{15 \text{ kHz}} = 66.67 \text{ usec}$$

Figure 11A:
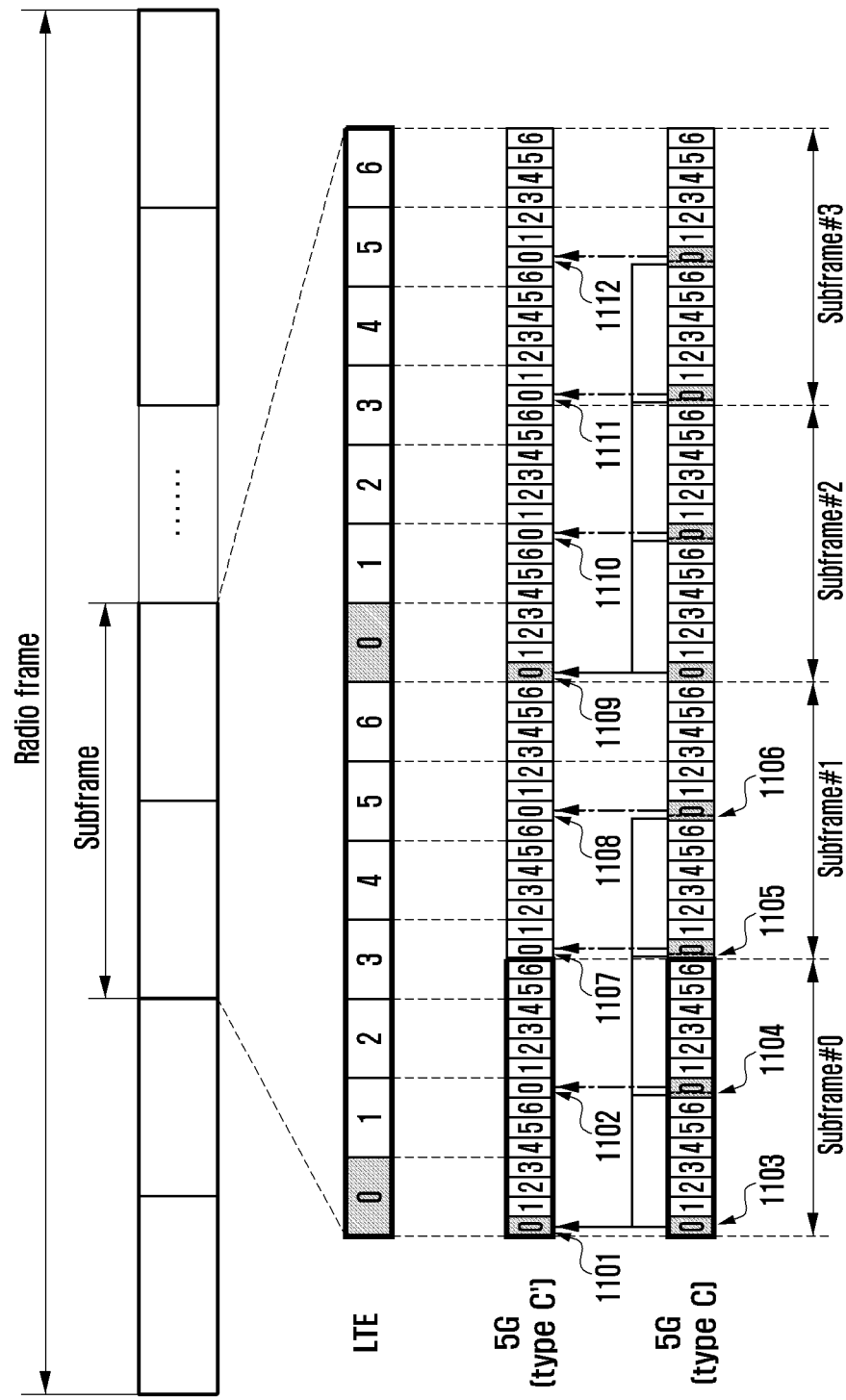
FIG. 11A illustrates a frame structure type C' according to an embodiment of the present disclosure.

FIG. 11A illustrates a frame structure type C' according to an embodiment of the present disclosure.

A length $T_{typeC,l}$ of a symbol of the I-th symbol of each slot in the subframe of the frame structure type C' may be expressed by Equation (7).

$$T_{typeC',l} = \begin{cases} \text{if } l = 0 \text{ and even slot} & \frac{T_{CP,0}}{2} + 3 \cdot \frac{T_{CP,0} - T_{CP,1}}{4} + \frac{T_{symb}}{4} \\ \text{of even subframe} & \\ \text{otherwise,} & \frac{T_{CP,1}}{4} + \frac{T_{symb}}{4} \end{cases}, \quad (7)$$

$$T_{typeC',0} + T_{typeC',1} + T_{typeC',2} + T_{typeC',3} =$$

$$\left(\frac{T_{CP,0}}{4} + 3 \cdot \frac{T_{CP,0} - T_{CP,1}}{4} + \frac{T_{symb}}{4}\right) + 3 \cdot \left(\frac{T_{CP,1}}{4} + \frac{T_{symb}}{4}\right) =$$

$$T_{CP,0} + T_{symb} = T_{typeA,0}$$

$$T_{CP,l} = \begin{cases} 5.21 \text{ usec } (l = 0) \\ 4.69 \text{ usec } (l = 1, 2, \ldots, 6) \end{cases},$$

$$T_{symb} = \frac{1}{15 \text{ kHz}} = 66.67 \text{ usec.}$$

Referring to FIG. 11A, CP lengths 1101 and 1109 of symbol #0 of a first slot (even-numbered slot, slot #0) of even-numbered subframes (subframes #0 and #2) among four 0.25 ms subframes (subframes #0, #1, #2, and #3) of the 5G corresponding to 1 ms subframe of LTE in the frame structure type C' are equal to a sum of a CP length 1103 of symbol #0 of the frame structure type C and three times of a difference between CP lengths of symbol #0 and other symbols (1104, 1105, and 1106). Further, CP lengths 1102 and 1110 of symbol #0 in a second slot in the even-numbered subframes (subframes #0 and #2) and CP lengths 1102 and 1110 of symbol #0 of the odd-numbered subframes (subframes #1 and #3) are equal to the CP lengths of the remaining symbols #1 to #6. Therefore, four symbols of the frame structure type C' are time synchronized with one symbol of LTE. In FIG. 11A, the CP length of the first symbol arriving every 0.5 ms is relatively longer than the CP length of the remaining symbols.

Figure 11B:
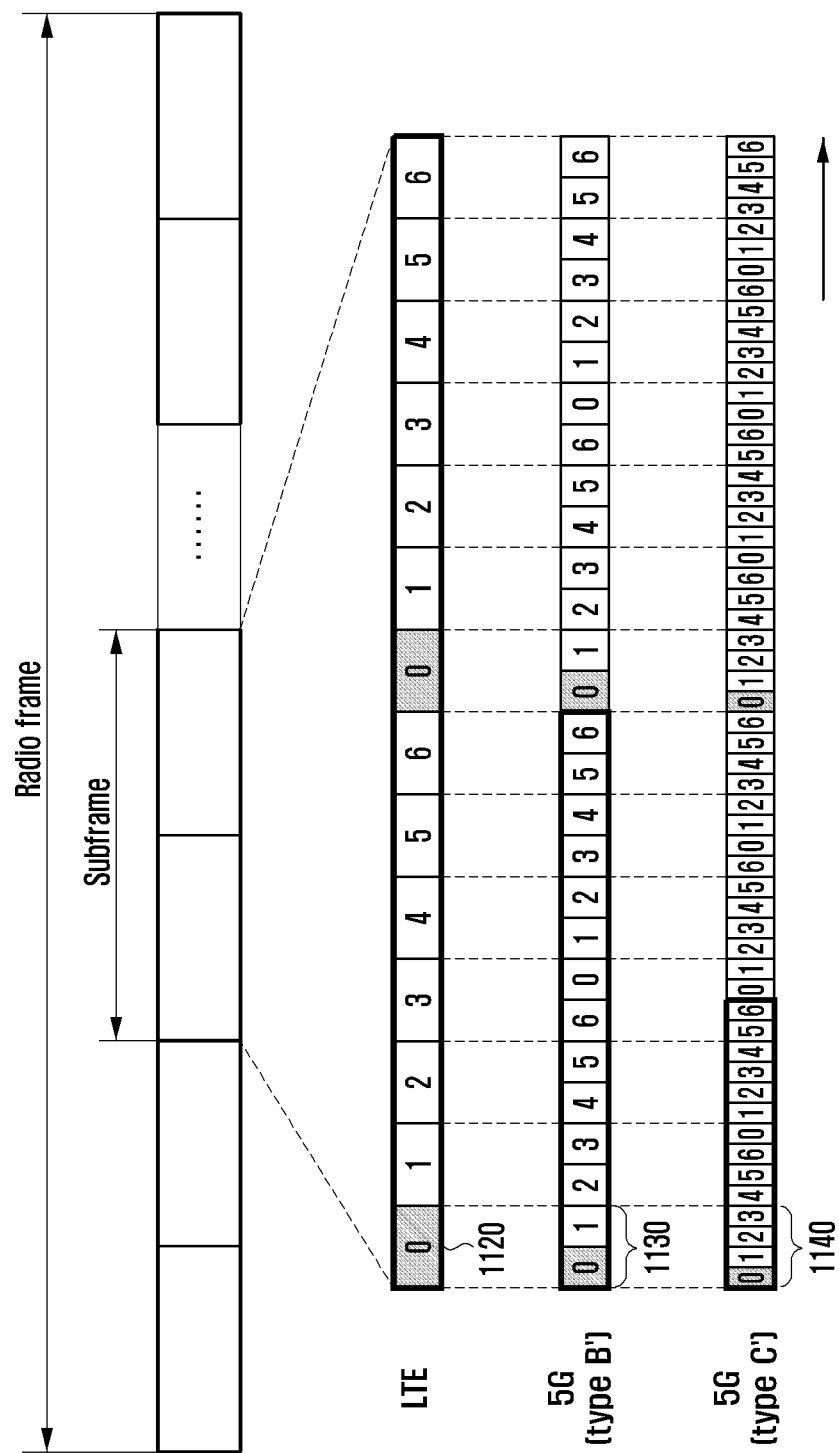
FIG. 11B illustrates frame structure types B' and C' according to an embodiment of the present disclosure.

FIG. 11B illustrates a correspondence relationship between a frame structure type B' and a frame structure type C' according to an embodiment of the present disclosure.

Referring to FIG. 11B, symbol #0 1120 of the LTE system is time synchronized with symbols #0 and #1 1130 of the frame structure type B' and frame structure types #0 to #3 1140. A symbol of the LTE system is time synchronized with each two symbols of the frame structure type B' and each four symbols of the frame structure type C'. Further, the frame structure type A and the frame structure types B' and C' have the same time synchronization relationship.

Figure 12:
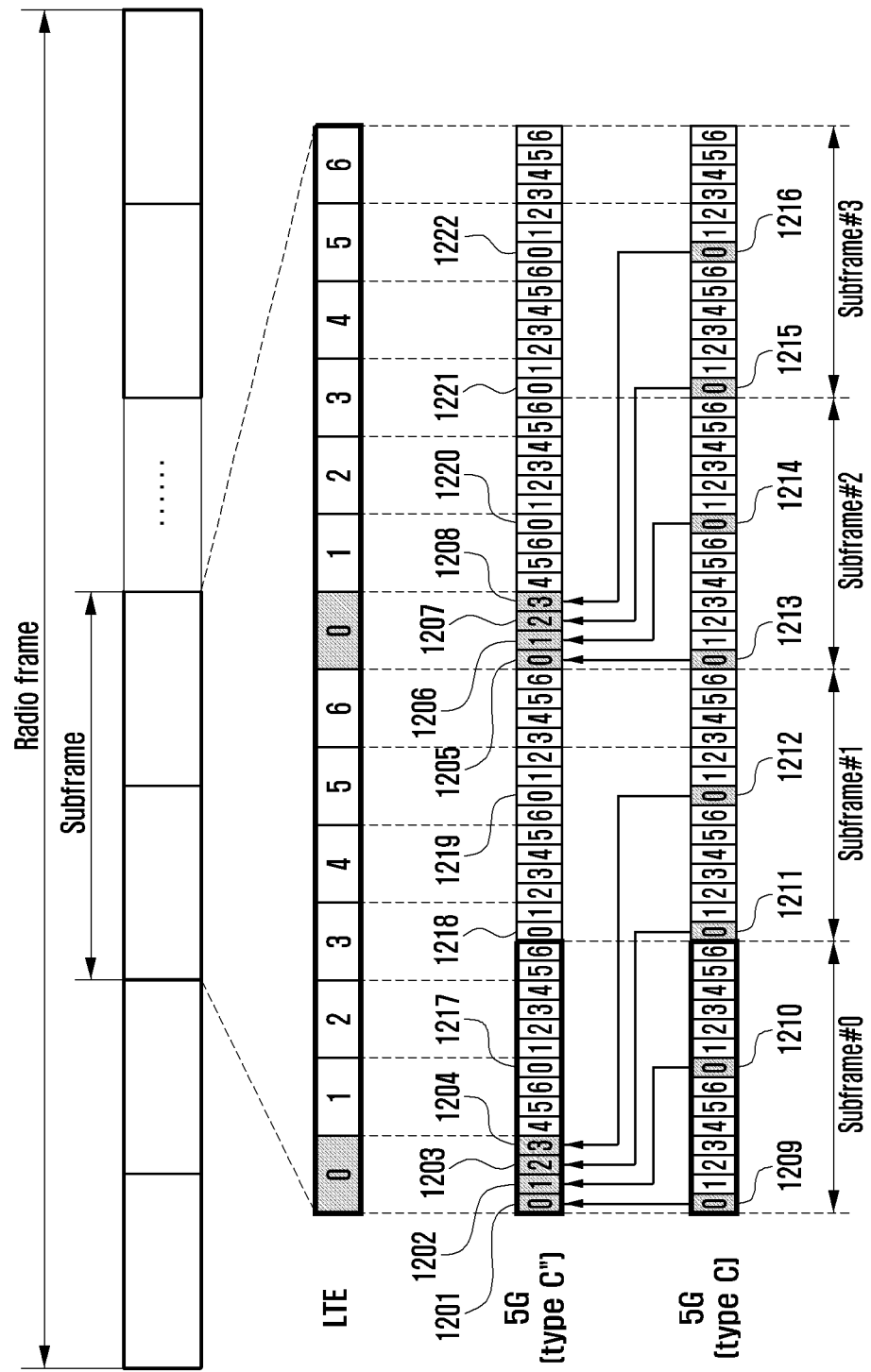
FIG. 12 illustrates a frame structure type C''' according to an embodiment of the present disclosure.

FIG. 12 illustrates a frame structure type C" according to an embodiment of the present disclosure.

Referring to FIG. 12, CP lengths 1201, 1202, 1203, 1204, 1205, 1206, 1207, and 1208 of symbols #0, #1, #2, and #3 of a first slot (even-numbered slot, slot #0) of even-numbered subframes (subframes #0 and #2) among four 0.25 ms subframes (subframes #0, #1, #2, and #3) of the 5G system corresponding to 1 ms subframe of LTE in the frame structure type C" are equal to CP lengths 1209, 1210, 1211, 1212, 1213, 1214, 1215, and 1216 of symbol #0 of the frame structure type C. That is, four symbols 1209, 1210, 1211, and 1212 having relatively long CP lengths of two subframes (subframe #0 and #1) are disposed at the head of even-numbered subframes, and thus, the sum of the lengths of the four symbols 1201, 1202, 1203, and 1204 are time synchronized with the symbol #0 of the subframe of LTE.

Further, CP lengths 1217 and 1220 of symbol #0 in a second slot in the even-numbered subframes (subframes #0 and #2) and CP lengths 1218, 1219, 1221, and 1222 of symbol #0 of the odd-numbered subframes (subframes #1 and #3) are equal to the CP lengths of the remaining symbols #1 to #6. Therefore, the four symbols of the frame structure type C" are time synchronized with one symbol of the LTE system.

In FIG. 12, the CP length of the first four symbols arriving every 0.5 ms is relatively longer than the CP length of the remaining symbols.

A length $T_{typeC'',l}$ of a symbol of the I-th symbol of each slot in the subframe of the frame structure type C" may be expressed by Equation (8).

$$T_{typeC'',l} = \begin{cases} \text{if } l = 0, 1, 2, 3 \text{ and even} & \frac{T_{CP,0}}{2} + \frac{T_{symb}}{4} \\ \text{slot of even subframe} \\ \text{otherwise,} & \frac{T_{CP,1}}{4} + \frac{T_{symb}}{4} \end{cases} \quad (8)$$

$$T_{typeC'',0} + T_{typeC'',1} + T_{typeC'',2} + T_{typeC'',3} =$$

$$\left(\frac{T_{CP,1}}{4} + \frac{T_{symb}}{4}\right) = T_{CP,0} + T_{symb} = T_{typeA,0}$$

$$T_{CP,l} = \begin{cases} 5.21 \text{ usec } (l = 0) \\ 4.69 \text{ usec } (l = 1, 2, \ldots, 6) \end{cases},$$

$$T_{symb} = \frac{1}{15 \text{ kHz}} = 66.67 \text{ usec}$$

Table 6 shows a CP length of the I-th symbol of each slot in the subframe of the frame structure type C' and the frame structure type C", a length of the symbol from which the CP is excluded, and a length of the symbol including the CP in a unit of μsec.

TABLE 6

| | CP length | Length of symbol (excluding CP) | Length of symbol (including CP) |
|---|---|---|---|
| Frame structure type C' | 1.69 μsec (l = 0 and even slot of even subframe) | 16.67 μsec | 18.36 μsec (l = 0 and even slot of even subframe) |

TABLE 6-continued

| | CP length | Length of symbol (excluding CP) | Length of symbol (including CP) |
|---|---|---|---|
| Frame structure type C" | 1.17 μsec (besides the above condition) 1.30 μsec (l = 0, 1, 2, 3, and even slot of even subframe) 1.17 μsec (besides the above condition) | 16.67 μsec | 17.84 μsec (besides the above condition) 17.97 μsec (l = 0, 1, 2, 3, and even slot of even subframe) 17.84 μsec (besides the above condition) |

Table 7 shows a CP length of the I-th symbol of each slot in the subframe of the frame structure type C', a length of the symbol from which the CP is excluded, and a length of the symbol including the CP in a unit of Ts that represents the time domain (where various Ts values are assumed).

TABLE 7

| Ts | CP length | Length of symbol (Excluding CP) | Length of symbol (including CP) |
|---|---|---|---|
| Ts = 1/ (60000 × 2048) sec | 208 Ts (l = 0 and even slot of even subframe) 144 Ts (besides the above condition) | 2048 Ts | 2256 Ts (l = 0 and even slot of even subframe) 2192 Ts (besides the above condition) |
| Ts = 1/ (60000 × 4096) sec | 416 Ts (l = 0 and even slot of even subframe) 288 Ts (besides the above condition) | 4096 Ts | 4512 Ts (l = 0 and even slot of even subframe) 4384 Ts (besides the above condition) |
| Ts = 1/ (60000 × 8192) sec | 832 Ts (l = 0 and even slot of even subframe) 576 Ts (besides the above condition) | 8192 Ts | 9024 Ts (l = 0 and even slot of even subframe) 8768 Ts (besides the above condition) |

Table 8 shows a CP length of the I-th symbol of each slot in the subframe of the frame structure type C", a length of the symbol from which the CP is excluded, and a length of the symbol including the CP in a unit of Ts that represents the time domain (where various Ts values are assumed).

TABLE 8

| Ts | CP length | Length of symbol (excluding CP) | Length of symbol (including CP) |
|---|---|---|---|
| Ts = 1/ (60000 × 2048) sec | 160 Ts (l = 0, 1, 2, 3, and even slot of even subframe) 144 Ts (besides the above condition) | 2048 Ts | 2208 Ts (l = 0, 1, 2, 3, and even slot of even subframe) 2192 Ts (besides the above condition) |
| Ts = 1/ (60000 × 4096) sec | 320 Ts (l = 0, 1, 2, 3, and even slot of even subframe) 288 Ts (besides the above condition) | 4096 Ts | 4416 Ts (l = 0, 1, 2, 3, and even slot of even subframe) 4384 Ts (besides the above condition) |
| Ts = 1/ (60000 × 8192) sec | 640 Ts (l = 0, 1, 2, 3, and even slot of even subframe) 576 Ts (besides the above condition) | 8192 Ts | 8832 Ts (l = 0, 1, 2, 3, and even slot of even subframe) 8768 Ts (besides the above condition) |

A frame structure type D has a subcarrier spacing that is smaller than the subcarrier spacings of LTE and LTE-A, i.e., the subcarrier spacing is 7.5 kHz, 14 symbols configure 2 ms subframes, and 12 subcarriers (=90 kHz=12×7.5 kHz) configure the PRB. The subcarrier spacing and the PRB size are twice as small as those of the frame structure type A, and the length of the subframe and the length of the symbol are twice as long as those of the frame structure type A. The lengths of the symbol of the LTE and LTE-A systems are uneven, and therefore, one symbol of the frame structure type D is not necessarily time-synchronized with two symbols of the LTE/LTE-A system.

Figure 13:
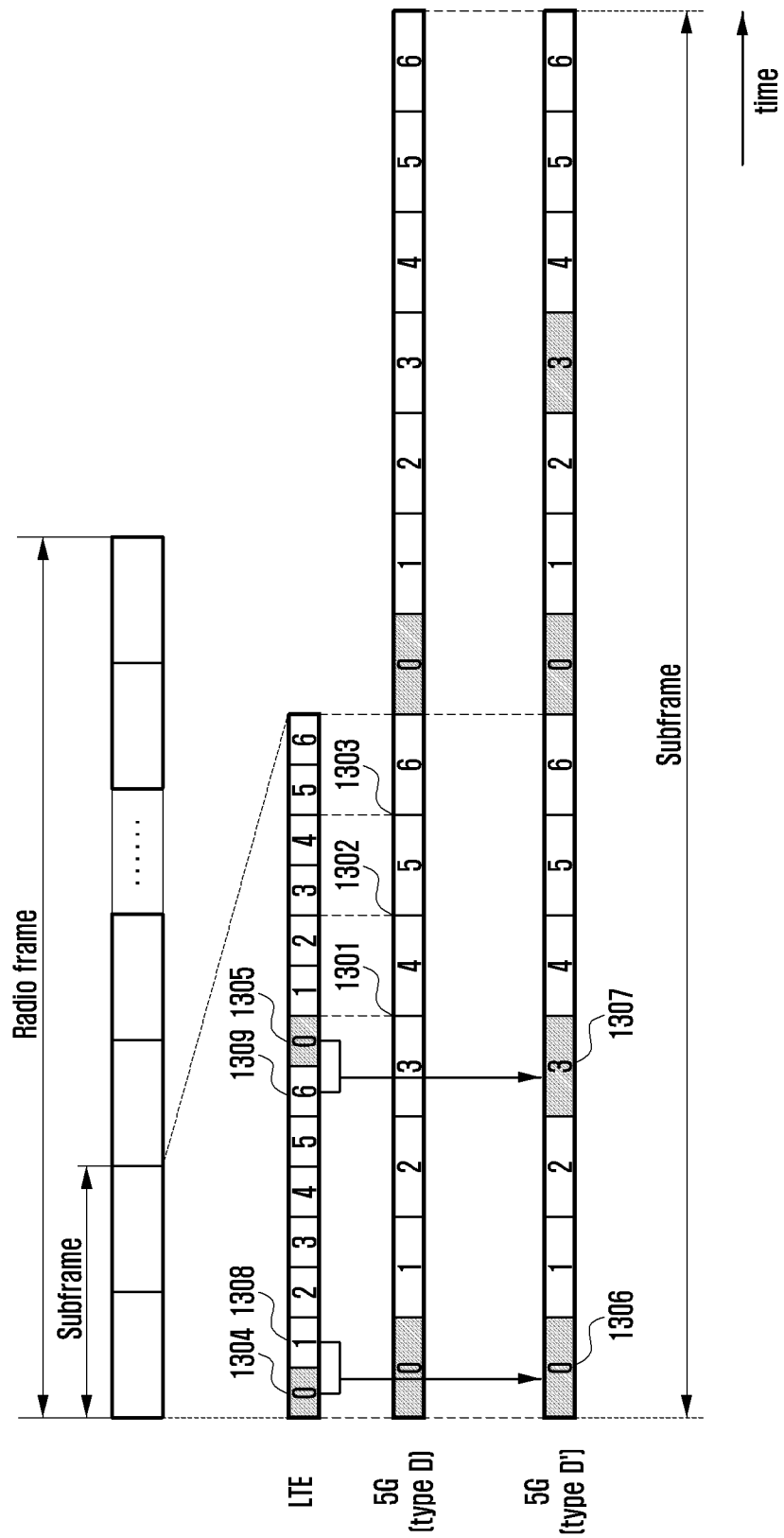
FIG. 13 illustrates a frame structure type D' according to an embodiment of the present disclosure.

FIG. 13 illustrates a frame structure type D and a frame structure type D' according to an embodiment of the present disclosure.

Referring to FIG. 13, two symbols of LTE and LTE-A systems are time-synchronized with one symbol of the frame structure type D, after a start point 1301 of symbol #4 of a first slot of the frame structure type D (1301, 1302, and 1303).

Referring to FIG. 13, the CP length of the symbol #0 1306 of the frame structure type D' in which the symbol positions are overlapped with the symbol #0 1304 and 1305 of LTE and LTE-A systems is equal to the sum of a CP length of symbol #0 1304 and a CP length of symbol #1 1308 of LTE and LTE-A systems. Similarly, a CP length of symbol #3 1307 of the frame structure type D' in which the symbol position are overlapped with the symbol #0 1305 of LTE and LTE-A systems is equal to the sum of a CP length of symbol #6 1309 and a CP length of symbol #0 1305 of LTE and LTE-A systems.

CP lengths of symbols #1, #2, #4, #5 and #6 of the other frame structure type D' are twice as long as the CP lengths of the remaining symbols other than the symbol #0 of LTE and LTE-A systems. Therefore, two symbols of LTE and LTE-A systems are synchronized with one symbol of the frame structure type D'.

Table 9 below shows a CP length of the I-th symbol of each slot in the subframe of the frame structure type D', a length of the symbol from which the CP is excluded, and a length of the symbol including the CP in a unit of μsec.

TABLE 9

| | CP length | Length of symbol (excluding CP) | Length of symbol (including CP) |
|---|---|---|---|
| Frame structure type D' | 9.90 μsec (l = 0, 3) 9.38 μsec (besides the above condition) | 133.33 μsec | 143.23 μsec (l = 0, 3) 142.71 μsec (besides the above condition) |

Figure 14:
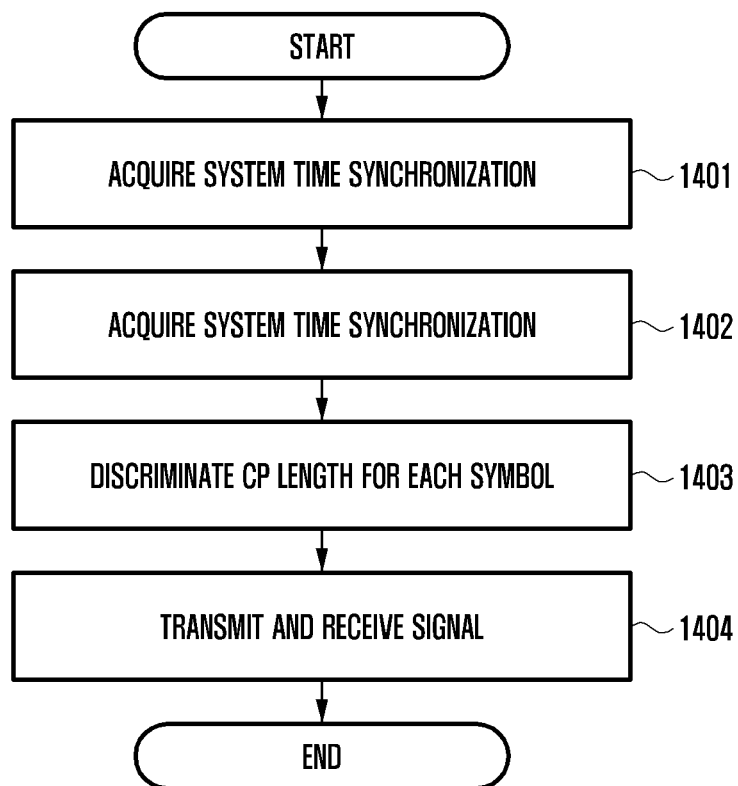
FIG. 14 is a flow chart illustrating a transmission/reception operation by a terminal according to an embodiment of the present disclosure.

FIG. 14 is a flow chart illustrating a transmission/reception operation by a terminal according to an embodiment of the present disclosure.

Referring to FIG. 14, in step 1401, the terminal acquires system time synchronization from the base station. For example, the system time synchronization includes time synchronization, such as a radio frame and a subframe, and the synchronization is acquired through an initial access procedure of the terminal.

In step 1402, the terminal acquires the frame structure type information from the base station. The base station may notify the terminal of the frame structure type information by semi-static signaling or dynamic signaling, or the terminal may determine the frame structure type information by blind detection. The base station and the terminal know beforehand about the channel through which the signaling is transmitted depending on which frame structure type is used to reduce the terminal complexity.

In step 1403, the terminal acquires the frame structure type information and adjusts the subcarrier spacing, the CP length per symbol, the length of the subframe, etc., which make up the parameter sets, according to the corresponding frame structure type.

In step 1404, the terminal transmits and receives a signal to and from the base station depending on the adjusted parameter sets.

Another aspect of the present disclosure is to reduce mutual interference, without adjusting the length or the position of the CP for each frame structure type in a system applying two different types of frame structures.

Figure 15:
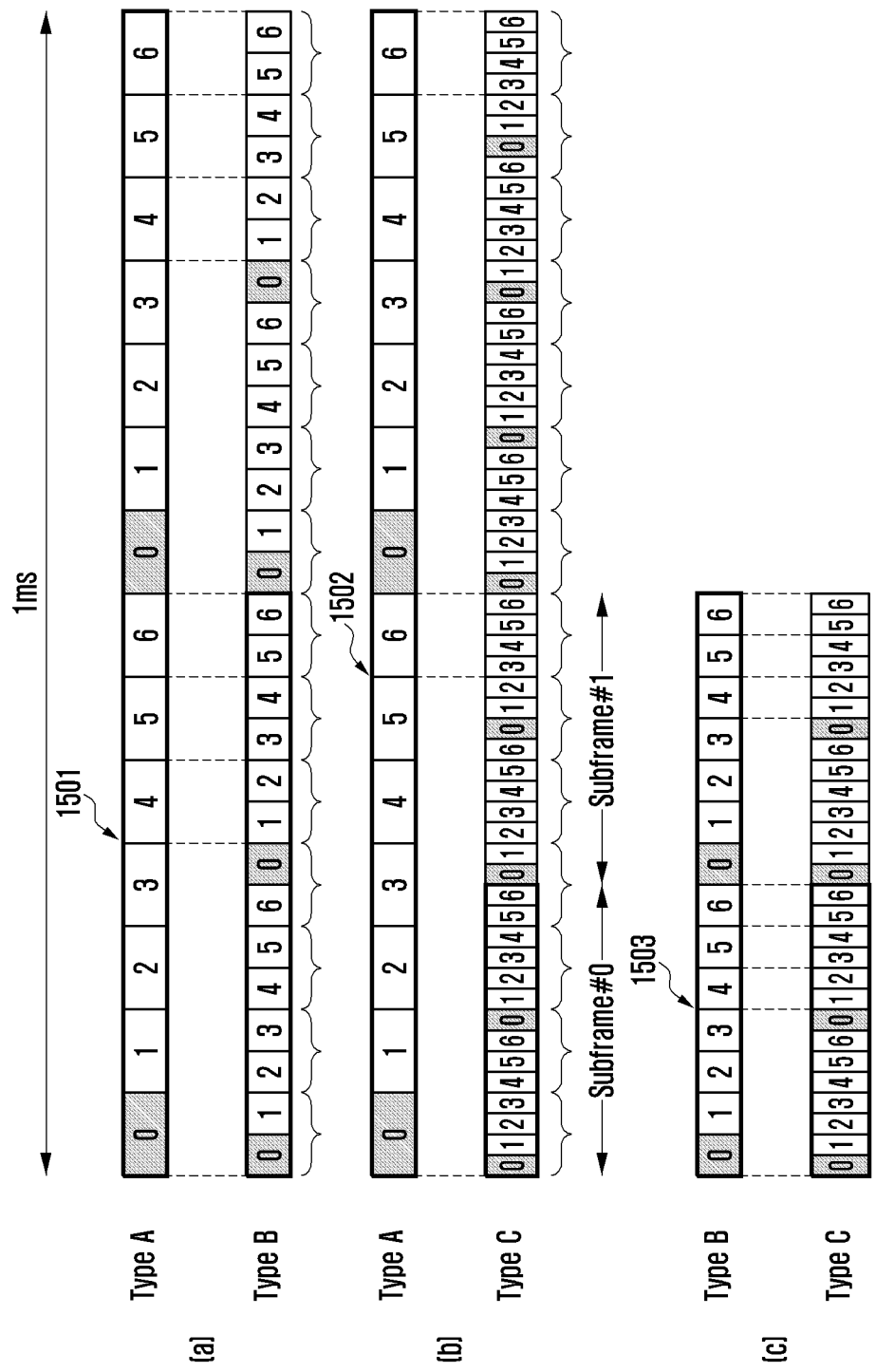
FIG. 15 illustrates a method for reducing interference in a system applying two different types of frame structures according to an embodiment of the present disclosure.

FIG. 15 illustrates a method for reducing interference in a system to which different types of frame structures are applied according to an embodiment of the present disclosure.

Referring to FIG. 15, item (a) shows a relationship between the frame structure type A and the frame structure type B. If the length of the symbol of the frame structure type B is ½ of the length of the symbol of the frame structure type A, the time synchronization in the symbol unit of the frame structure type A and the frame structure type B before a start point 1501 of symbol #4 of the symbol structure type A is not made. That is, the time synchronization with the symbol of the frame structure type B is made only at start points of the symbols #0, #4, #5, and #6 of each slot based on the frame structure type A because the CP length of the symbol #0 is relatively long, and the signal transmission in an interval in which the time synchronization between the symbols is not made causes the interference with the signal using the counterpart frame structure type.

More specifically, the signal transmission in the symbols #2, #4 and #6 of the frame structure type B causes signal interference on two symbols (symbol #0 and symbol #1, symbol #1 and symbol #2, symbol #2 Symbol #3) in the frame structure type A, which may lead to a deterioration in system performance. Therefore, in this case, there is a need to put restraints to avoid the symbols that overlap the symbol boundaries of the symbols #1, #2, and #3 in the frame structure type A as a starting point at which a signal may be transmitted in the frame structure type B. That is, from the viewpoint of the frame structure type B, the starting point of the signal transmission becomes symbols #0, #1, #3, and #5 of the first slot and symbols #0, #1, #2, #3, #5, and #6 of the second slot.

Item (b) shows the relationship between the frame structure type A and the frame structure type C. If the length of the symbol of the frame structure type C is ¼ times of the length of the symbol of the frame structure type A, before a start point 1502 of symbol #6 of the symbol structure type A, the time synchronization in the symbol unit of the frame structure type A and the frame structure type C is not made. That is, the time synchronization with the symbol of the frame structure type C is made only at start points of the symbols #0 and #6 of each slot based on the frame structure type A. Therefore, in this case, there is a need to put restraints to avoid the symbols that overlap the symbol boundaries of the symbols #1, #2, #3, #4, and #5 in the frame structure type A as a starting point at which a signal may be transmitted in the frame structure type C. That is, from the viewpoint of the frame structure type C, the start points of the signal transmission become symbols #0, #1, #2, #3, #5, and #6 of a first slot of subframe #0, symbols #0, #2, #3, #4 and #6 of a second slot of subframe #0, symbols #0, #1, #3, #4, and #5 of a first slot of subframe #1, and #0, #1, #2, #3, #4, #5, and #6 of a second slot of subframe #1.

Item (c) shows a relationship between the frame structure type B and the frame structure type C. If the length of the symbol of the frame structure type C is ½ times of the length of the symbol of the frame structure type B, before a start point 1503 of symbol #4 of the symbol structure type B, the time synchronization in the symbol unit of the frame structure type B and the frame structure type C is not made. That is, the time synchronization with the symbol of the frame structure type C is made only at start points of symbols #0, #4, #5, and #6 of each slot based on the frame structure type B. Therefore, in this case, there is a need to put restraints to avoid the symbols that overlap the symbol boundaries of the symbols #1, #2, and #3 in the frame structure type B as a starting point at which a signal may be transmitted in the frame structure type C. That is, from the viewpoint of the frame structure type C, the starting point of the signal transmission becomes symbols #0, #1, #3, and #5 of the first slot and symbols #0, #1, #2, #3, #5, and #6 of the second slot.

Accordingly, a start symbol position capable of the signal transmission in the frame structure type having a shorter symbol length between frame structure types having N times scalability of a symbol length of each frame structure type can be generalized as follows:

If the time synchronization with symbols of the frame structure type having a longer symbol length is made in N symbol units of the frame structure type having a shorter symbol length, all the symbols configuring the N symbol units.

If the time synchronization does not coincide with the symbol of the frame structure type having a longer symbol length in N symbol units of the frame structure type having a shorter symbol length, all of the remaining symbols, except for the first symbol among the N symbol units with which the time synchronization does not coincide.

When symbol transmission is started at a start symbol position, there is no restriction to transmit a signal from the start symbol over consecutive symbols. Since the terminal may expect the base station to start the data transmission at a start symbol position, the terminal does not perform a reception operation of the scheduling information from the base station in the symbols other than the start symbol, thereby reducing complexity and power consumption.

Figure 16:
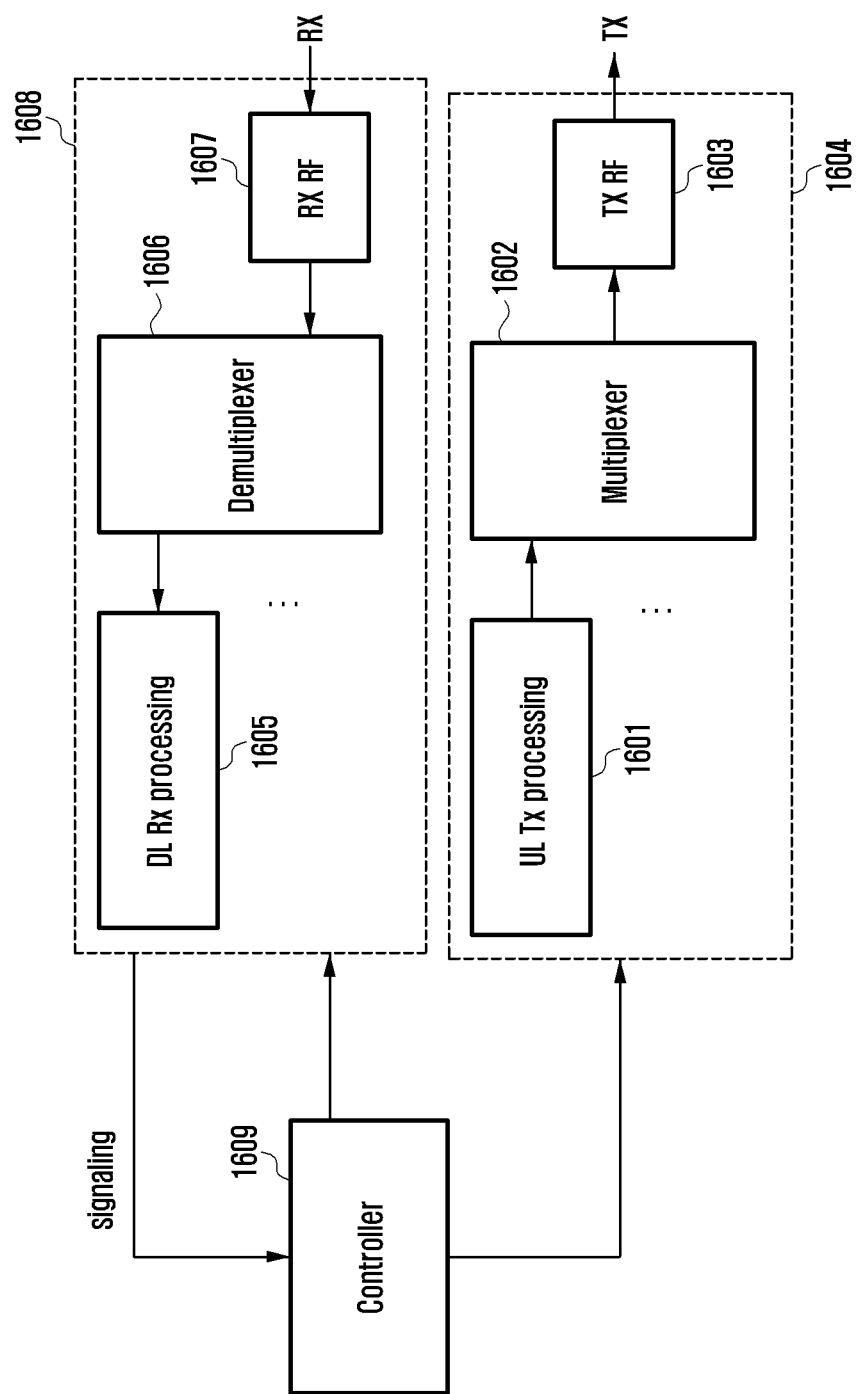
FIG. 16 illustrates a terminal apparatus according to an embodiment of the present disclosure.

FIG. 16 illustrates a terminal apparatus according to an embodiment of the present disclosure.

Referring to FIG. 16, the terminal includes a transmitter 1604 including a UL transmission processor 1601, a multiplexer 1602, a radio frequency (RF) transmitter 1603, a receiver 1608 including a DL reception processor 1605, a demultiplexer 1606, and an RF receiver 1607, and a controller 1609. Alternatively, the transmitter 1604 and the receiver 1608 may be implemented in a single unit as a transceiver, and each component may be implemented through one or more processors.

The controller 1609 determines which scalable frame structure is applied based on a signal detected from the base station or signaling of the base station to control the receiver 1608 for the DL signal reception of the terminal and the transmitter 1604 for the UL signal transmission. Specifically, the controller 1609 may confirm the scalable frame structure applied at the time of the signal transmission to transmit and receive the signal to and from the base station depending on the scalable frame structure.

The UL transmission processor 1601 may perform processes, such as the channel coding and modulation, to generate a signal to be transmitted. The signal generated from the UL transmission processor 1601 is multiplexed with other uplink signals by the multiplexer 1602, processed by the RF transmitter 1603, and then transmitted to the base station.

In the receiver 1608, the RF receiver 1607 receives a signal from the base station, the demultiplexer 1606 demultiplexes the received signal, and distributes the demultiplexed signal to the DL reception processor 1605. The DL reception processor 1605 performs processes, such as demodulation and channel decoding, on the downlink signal of the base station to obtain control information or data transmitted by the base station. The receiver 1608 applies the output result of the DL reception processor 1605 to the controller 1609 to support the operation of the controller 1609.

Figure 17:
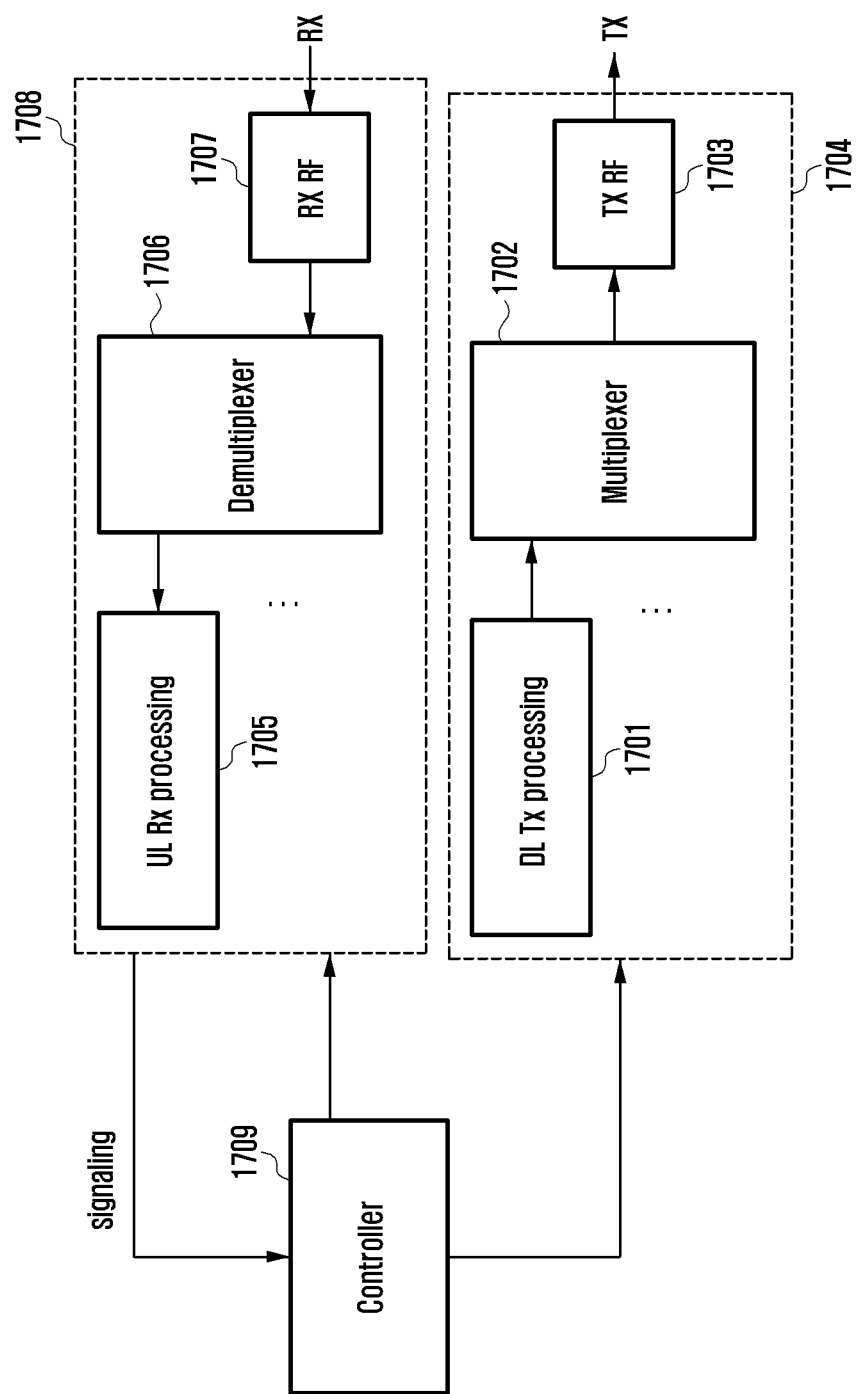
FIG. 17 illustrates a base station apparatus according to an embodiment of the present disclosure.

FIG. 17 illustrates a base station apparatus according to an embodiment to the present disclosure.

Referring to FIG. 17, the base station includes a transmitter 1704 including a DL transmission processor 1701, a multiplexer 1702, and an RF transmitter 1703, a receiver 1708 including a UL reception processor 1705, a demultiplexer 1706, and an RF receiver 1707, and a controller 1709. Alternatively, the transmitter 1704 and the receiver 1708 may be implemented in a single unit as a transceiver, and each component may be implemented through one or more processors.

The controller 1709 determines which scalable frame structure is applied in order to control the receiver 1708 for the UL signal reception and the transmitter 1704 for the DL signal transmission. Further, the controller 1709 controls the transmitter 1704 to transmit information on the scalable frame structure to the terminal. Specifically, the controller 1709 may confirm the scalable frame structure applied at the time of the signal transmission in order to transmit and receive the signal to and from the terminal depending on the scalable frame structure.

The downlink transmission processor 1701 performs the processes, such as channel coding and modulation, to generate a signal to be transmitted. The signal generated from the DL transmission processor 1701 is multiplexed with other downlink signals by the multiplexer 1702, processed by the RF transmitter 1703, and then transmitted to the terminal.

In the receiver 1708, the RF receiver 1707 receives a signal from the terminal, the demultiplexer 1706 demultiplexes the received signal, and distributes the demultiplexed signal to the UL reception processor 1705. The UL reception processor 1705 performs processes, such as demodulation and channel decoding, on the UL signal of the terminal to obtain control information or data transmitted by the terminal. The receiver 1708 applies the output result of the UL reception processor 1705 to the controller 1709 to support the operation of the controller 1709.

Alternatively, the base station may also include the transceiver and the controller capable of controlling the same. Further, the transceiver and the controller may include at least one processor.

The above-described embodiments of the present disclosure and the accompanying drawings have been provided only as specific examples in order to assist in understanding the present disclosure and do not limit the scope of the present disclosure. Accordingly, those skilled in the art to which the present disclosure pertains will understand that other change examples based on the technical idea of the present disclosure may be made without departing from the scope of the present disclosure.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method performed by a base station in a wireless communication system, the method comprising:
   transmitting, to a terminal, information on a frame structure among a plurality of frame structures, wherein the information on the frame structure includes a subcarrier spacing and a cyclic prefix of the frame structure; and
   transmitting, to the terminal, scheduling information based on a transmission time interval (TTI) of the frame structure, as a unit of a scheduling,
   wherein the plurality of frame structures includes a first frame structure and a second frame structure,
   wherein a subcarrier spacing of the first frame structure is 15 kHz and a subcarrier spacing of the second frame structure is 30 kHz,
   wherein a first TTI of the first frame structure and a second TTI of the second frame structure each include 14 symbols, and a duration of the first TTI is 1 ms and a duration of the second TTI is 0.5 ms,
   wherein each of a symbol duration of a first symbol and a symbol duration of an eighth symbol in the first TTI is longer than a symbol duration of any of other symbols in the first TTI, and a symbol duration of a first symbol in the second TTI is longer than a symbol duration of any of other symbols in the second TTI,
   wherein the symbol duration of the first symbol in the first TTI equals a sum of the symbol duration of the first symbol and a symbol duration of a second symbol in the second TTI such that two symbols in the second TTI are time synchronized with one symbol of the first TTI,
   wherein a duration of a cyclic prefix of the first symbol in the second TTI is TCP.0/2+(TCP.0-TCP.1)/2 and a duration of an orthogonal frequency division multiplexing (OFDM) symbol of the first symbol in the second TTI is Tsymb/2, where Tsymb is a duration of an OFDM symbol in the first TTI, TCP.0 is a duration of a cyclic prefix of each of the first symbol and the eighth symbol in the first TTI and TCP.1 is a duration of a cyclic prefix of another symbol in the first TTI, and
   wherein a duration of a cyclic prefix of the second symbol in the second TTI is TCP.1/2 and a duration of an OFDM symbol of the second symbol in the second TTI is Tsymb/2.

2. The method of claim 1, wherein the symbol duration of the first symbol in the first TTI is 71.88 μsec, the symbol duration of the eighth symbol in the first TTI is 71.88 μsec, and the symbol duration of any of the other symbols in the first TTI is 71.35 μsec, and
   wherein the duration of the cyclic prefix of the first symbol in the first TTI is 5.21 μsec, a duration of a cyclic prefix of the eighth symbol in the first TTI is 5.21 μsec, and the duration of the OFDM symbol in the first TTI is 66.67 μsec.

3. The method of claim 1, wherein the symbol duration of the first symbol in the second TTI is 36.20 μsec and the symbol duration of any of the other symbols in the second TTI is 35.68 μsec, and
   wherein the duration of the cyclic prefix of the first symbol in the second TTI is 2.87 μsec and the duration of the OFDM symbol of the first symbol in the second TTI is 33.33 μsec.

4. The method of claim 1, wherein the information on the frame structure is transmitted via semi-static signaling.

5. A method performed by a terminal in a wireless communication system, the method comprising:
   receiving, from a base station, information on a frame structure among a plurality of frame structures, wherein the information on the frame structure includes a subcarrier spacing and a cyclic prefix of the frame structure; and
   receiving, from the base station, scheduling information based on a transmission time interval (TTI) of the frame structure, as a unit of a scheduling,
   wherein the plurality of frame structures includes a first frame structure and a second frame structure,
   wherein a subcarrier spacing of the first frame structure is 15 kHz and a subcarrier spacing of the second frame structure is 30 kHz,
   wherein a first TTI of the first frame structure and a second TTI of the second frame structure each include 14 symbols, and a duration of the first TTI is 1 ms and a duration of the second TTI is 0.5 ms,
   wherein each of a symbol duration of a first symbol and a symbol duration of an eighth symbol in the first TTI is longer than a symbol duration of any of other symbols in the first TTI, and a symbol duration of a first symbol in the second TTI is longer than a symbol duration of any of other symbols in the second TTI,
   wherein the symbol duration of the first symbol in the first TTI equals a sum of the symbol duration of the first symbol and a symbol duration of a second symbol in the second TTI such that two symbols in the second TTI are time synchronized with one symbol of the first TTI,
   wherein a duration of a cyclic prefix of the first symbol in the second TTI is TCP.0/2+(TCP.0-TCP.1)/2 and a duration of an orthogonal frequency division multiplexing (OFDM) symbol of the first symbol in the second TTI is Tsymb/2, where Tsymb is a duration of an OFDM symbol in the first TTI, TCP.0 is a duration of a cyclic prefix of each of the first symbol and the eighth symbol in the first TTI and TCP.1 is a duration of a cyclic prefix of another symbol in the first TTI, and
   wherein a duration of a cyclic prefix of the second symbol in the second TTI is TCP.1/2 and a duration of an OFDM symbol of the second symbol in the second TTI is Tsymb/2.

6. The method of claim 5, wherein the symbol duration of the first symbol in the first TTI is 71.88 μsec, the symbol duration of the eighth symbol in the first TTI is 71.88 μsec, and the symbol duration of any of the other symbols in the first TTI is 71.35 μsec, and
   wherein the duration of the cyclic prefix of the first symbol in the first TTI is 5.21 μsec, a duration of a cyclic prefix of the eighth symbol in the first TTI is 5.21 μsec, and the duration of the OFDM symbol in the first TTI is 66.67 μsec.

7. The method of claim 5, wherein the symbol duration of the first symbol in the second TTI is 36.20 μsec and the symbol duration of any of the other symbols in the second TTI is 35.68 μsec, and wherein the duration of the cyclic prefix of the first symbol in the second TTI is 2.87 μsec and the duration of the OFDM symbol of the first symbol in the second TTI is 33.33 μsec.

8. The method of claim 5,
wherein the information on the frame structure is received via semi-static signaling.

9. A base station in a wireless communication system, the base station comprising:
a transceiver; and
a controller coupled with the transceiver and configured to:
transmit, to a terminal, information on a frame structure among a plurality of frame structures, wherein the information on the frame structure includes a subcarrier spacing and a cyclic prefix of the frame structure, and
transmit, to the terminal, scheduling information based on a transmission time interval (TTI) of the frame structure, as a unit of a scheduling,
wherein the plurality of frame structures includes a first frame structure and a second frame structure,
wherein a subcarrier spacing of the first frame structure is 15 kHz and a subcarrier spacing of the second frame structure is 30 kHz,
wherein a first TTI of the first frame structure and a second TTI of the second frame structure each include 14 symbols, and a duration of the first TTI is 1 ms and a duration of the second TTI is 0.5 ms,
wherein each of a symbol duration of a first symbol and a symbol duration of an eighth symbol in the first TTI is longer than a symbol duration of any of other symbols in the first TTI, and a symbol duration of a first symbol in the second TTI is longer than a symbol duration of any of other symbols in the second TTI,
wherein the symbol duration of the first symbol in the first TTI equals a sum of the symbol duration of the first symbol and a symbol duration of a second symbol in the second TTI such that two symbols in the second TTI are time synchronized with one symbol of the first TTI,
wherein a duration of a cyclic prefix of the first symbol in the second TTI is TCP.0/2+(TCP.0-TCP.1)/2 and a duration of an orthogonal frequency division multiplexing (OFDM) symbol of the first symbol in the second TTI is Tsymb/2, where Tsymb is a duration of an OFDM symbol in the first TTI, TCP.0 is a duration of a cyclic prefix of each of the first symbol and the eighth symbol in the first TTI and TCP.1 is a duration of a cyclic prefix of another symbol in the first TTI, and
wherein a duration of a cyclic prefix of the second symbol in the second TTI is TCP.1/2 and a duration of an OFDM symbol of the second symbol in the second TTI is Tsymb/2.

10. The base station of claim 9, wherein the symbol duration of the first symbol in the first TTI is 71.88 μsec, the symbol duration of the eighth symbol in the first TTI is 71.88 μsec, and the symbol duration of any of the other symbols in the first TTI is 71.35 μsec, and
wherein the duration of the cyclic prefix of the first symbol in the first TTI is 5.21 μsec, a duration of a cyclic prefix of the eighth symbol in the first TTI is 5.21 μsec, and the duration of the OFDM symbol in the first TTI is 66.67 μsec.

11. The base station of claim 9, wherein the symbol duration of the first symbol in the second TTI is 36.20 μsec and the symbol duration of any of the other symbols in the second TTI is 35.68 μsec, and
wherein the duration of the cyclic prefix of the first symbol in the second TTI is 2.87 μsec and the duration of the OFDM symbol of the first symbol in the second TTI is 33.33 μsec.

12. The base station of claim 9, wherein the information on the frame structure is transmitted via semi-static signaling.

13. A terminal in a wireless communication system, the terminal comprising:
a transceiver; and
a controller coupled with the transceiver and configured to:
receive, from a base station, information on a frame structure among a plurality of frame structures, wherein the information on the frame structure includes a subcarrier spacing and a cyclic prefix of the frame structure, and
receive, from the base station, scheduling information based on a transmission time interval (TTI) of the frame structure, as a unit of a scheduling,
wherein the plurality of frame structures includes a first frame structure and a second frame structure,
wherein a subcarrier spacing of the first frame structure is 15 kHz and a subcarrier spacing of the second frame structure is 30 kHz,
wherein a first TTI of the first frame structure and a second TTI of the second frame structure each include 14 symbols, and a duration of the first TTI is 1 ms and a duration of the second TTI is 0.5 ms,
wherein each of a symbol duration of a first symbol and a symbol duration of an eighth symbol in the first TTI is longer than a symbol duration of any of other symbols in the first TTI, and a symbol duration of a first symbol in the second TTI is longer than a symbol duration of any of other symbols in the second TTI,
wherein the symbol duration of the first symbol in the first TTI equals a sum of the symbol duration of the first symbol and a symbol duration of a second symbol in the second TTI such that two symbols in the second TTI are time synchronized with one symbol of the first TTI,
wherein a duration of a cyclic prefix of the first symbol in the second TTI is TCP.0/2+(TCP.0-TCP.1)/2 and a duration of an orthogonal frequency division multiplexing (OFDM) symbol of the first symbol in the second TTI is Tsymb/2, where Tsymb is a duration of an OFDM symbol in the first TTI, TCP.0 is a duration of a cyclic prefix of each of the first symbol and the eighth symbol in the first TTI and TCP.1 is a duration of a cyclic prefix of another symbol in the first TTI, and
wherein a duration of a cyclic prefix of the second symbol in the second TTI is TCP.1/2 and a duration of an OFDM symbol of the second symbol in the second TTI is Tsymb/2.

14. The terminal of claim 13, wherein the symbol duration of the first symbol in the first TTI is 71.88 μsec, the symbol duration of the eighth symbol in the first TTI is 71.88 μsec, and the symbol duration of any of the other symbols in the first TTI is 71.35 μsec, and
wherein the duration of the cyclic prefix of the first symbol in the first TTI is 5.21 μsec, a duration of a cyclic prefix of the eighth symbol in the first TTI is 5.21 μsec, and the duration of the OFDM symbol in the first TTI is 66.67 μsec.

15. The terminal of claim 13, wherein the symbol duration of the first symbol in the second TTI is 36.20 μsec and the symbol duration of any of the other symbols in the second TTI is 35.68 μsec, and wherein the duration of the cyclic prefix of the first symbol in the second TTI is 2.87 μsec and the duration of the OFDM symbol of the first symbol in the second TTI is 33.33 μsec.

16. The terminal of claim 13, wherein the information on the frame structure is received via semi-static signaling.

* * * * *